United States Patent
Hu et al.

(10) Patent No.: US 11,009,582 B2
(45) Date of Patent: May 18, 2021

(54) METHOD, APPARATUS, AND SYSTEM FOR POSITIONING TERMINAL DEVICE

(71) Applicant: HUAWEI TECHNOLOGIES CO., LTD., Guangdong (CN)

(72) Inventors: Bin Hu, Shanghai (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/919,318

(22) Filed: Jul. 2, 2020

(65) Prior Publication Data
US 2020/0333427 A1 Oct. 22, 2020

Related U.S. Application Data

(63) Continuation of application No. PCT/CN2018/123374, filed on Dec. 25, 2018.

(30) Foreign Application Priority Data

Jan. 5, 2018 (CN) .......................... 201810011364.8

(51) Int. Cl.
  *G01S 5/06* (2006.01)
  *H04W 8/24* (2009.01)
  *H04W 24/10* (2009.01)

(52) U.S. Cl.
  CPC .................. *G01S 5/06* (2013.01); *H04W 8/24* (2013.01); *H04W 24/10* (2013.01)

(58) Field of Classification Search
  CPC ....... H04L 25/0204; H04L 43/08; G01S 5/10; G01S 5/0215; G01S 1/20; G01S 5/0273;
  (Continued)

(56) References Cited

U.S. PATENT DOCUMENTS

| | | | |
|---|---|---|---|
| 9,482,742 B1 | 11/2016 | Fischer | |
| 2012/0014412 A1* | 1/2012 | Nakagawa | G01S 5/12 375/130 |

(Continued)

FOREIGN PATENT DOCUMENTS

| | | |
|---|---|---|
| CN | 1744763 A | 3/2006 |
| CN | 101489180 A | 7/2009 |

(Continued)

OTHER PUBLICATIONS

"Simultaneous Target and Multipath Positioning" by Li et al., dated Feb. 2014 (Year: 2014).*

(Continued)

*Primary Examiner* — Daniel Lai

(57) ABSTRACT

A method and an apparatus may be used for positioning a terminal device. Positioning measurement information for a terminal device is obtained by using a measurement apparatus on the terminal device side and/or an access node side, where the positioning measurement information is multipath positioning measurement information that is based on a single access node, and includes positioning measurement information of a main path and at least one reflection path that are based on the single access node, or positioning measurement information for at least two reflection paths. The measurement apparatus on the terminal device side and/or the access node side reports the positioning measurement information to a positioning function entity in a network, so that the positioning function entity can perform location estimation on the terminal device based on the positioning measurement information, to position the terminal device.

18 Claims, 11 Drawing Sheets

(58) Field of Classification Search
CPC . G01S 5/0236; G01S 3/74; G01S 5/02; G01S 1/045; G01S 19/05; G01S 5/00; G01S 5/0268; G01S 7/4865; G01S 13/00; G01S 2013/462; G01S 5/0218; G01S 5/06; G01S 19/22; G01S 5/0252; G01S 17/89; G01S 19/46; G01S 7/354; G01S 7/4802; G01S 13/46; G01S 19/26; G01S 19/42; G01S 19/426; G01S 19/428; G01S 5/0242; G01S 7/023; G01S 7/487; G01S 13/06; G01S 13/755; G01S 17/04; G01S 17/06; G01S 5/02521; G01S 5/04; H04W 64/00; H04W 4/029; H04W 64/003; H04W 4/02; H04W 4/025; H04W 8/24; H04W 24/10; H04W 64/006; H04W 4/023; H04W 24/02; H04W 4/027; H04W 4/33; H04W 4/38; H04B 7/0413
See application file for complete search history.

(56) References Cited

U.S. PATENT DOCUMENTS

| | | | | |
|---|---|---|---|---|
| 2013/0109405 | A1* | 5/2013 | Siomina | H04W 64/00 455/456.1 |
| 2013/0172007 | A1 | 7/2013 | Wax et al. | |
| 2013/0267258 | A1* | 10/2013 | Yeo | G01S 5/10 455/456.5 |
| 2014/0022128 | A1* | 1/2014 | Smith | G01S 5/0273 342/465 |
| 2016/0277898 | A1 | 9/2016 | Bengtsson et al. | |
| 2020/0217918 | A1* | 7/2020 | Ryden | G01S 5/0236 |

FOREIGN PATENT DOCUMENTS

| | | | | |
|---|---|---|---|---|
| CN | 102045838 | A | | 5/2011 |
| CN | 102045840 | A * | 5/2011 | ............ H04W 64/00 |
| CN | 102045840 | A | | 5/2011 |
| CN | 102098778 | A | | 6/2011 |
| CN | 202110642 | U | | 1/2012 |
| CN | 103096464 | A | | 5/2013 |
| CN | 105191236 | A | | 12/2015 |
| CN | 105264920 | A | | 1/2016 |
| CN | 106162865 | A | | 11/2016 |
| CN | 106658713 | A | | 5/2017 |
| CN | 107148081 | A | | 9/2017 |

OTHER PUBLICATIONS

"Direct Position Estimation Utilizing Non-Line-of-Sight (NLOS) GPS Signals" by Ng et al., published in Proceedings of the 29th International Technical Meeting of the Satellite Division of the Institute of Navigation (ION GNSS+ 2016), dated Sep. 12, 2016 (Year: 2016).*

Huawei et al.,"Discussion on core requirements for further indoor positioning enhancements for UTRA and LTE", 3GPP TSG-RAN Meeting #74 RP-162176, Vienna, Austria, Dec. 5-8, 2016, total 3 pages.

Extended European Search Report dated Jan. 22, 2021, issued in EP Application No. 18897983.5, total 10 pages.

Office Action dated Mar. 3, 2021 issued in Chinese Application No. 201810011364.8 (12 pgs.).

* cited by examiner

METHOD, APPARATUS, AND SYSTEM FOR POSITIONING TERMINAL DEVICE

CROSS-REFERENCE TO RELATED APPLICATIONS

This application is a continuation of International Application No. PCT/CN2018/123374, filed on Dec. 25, 2018, which claims priority to Chinese Patent Application No. 201810011364.8, filed on Jan. 5, 2018. The disclosures of the aforementioned applications are hereby incorporated by reference in their entireties.

TECHNICAL FIELD

This disclosure relates to the field of positioning technologies, and in particular, to a terminal device positioning technology in a communications system.

BACKGROUND

With development of communications technologies and popularization of mobile devices, people have a sharply increasing quantity of requirements for a positioning service of their own locations. A positioning technology that is based on a mobile communications network is developing rapidly, and has a significant position in daily travel, vehicle positioning and navigation, radio resource allocation and integration, national information security, and the like. In a current 3GPP protocol, in user positioning in a wireless communications system, positioning calculation is performed by using a measurement value of a radio signal detected by a base station and/or a terminal. Main positioning technologies include: (1) distance positioning, in which positioning calculation is performed by using a distance (TOA) between a terminal and two or more base stations; and (2) angle positioning, in which positioning calculation is performed by using an angle (AOA) between a terminal and two or more base stations. Both a TOA and an AOA used in the prior art are measurement values in a line-of-sight (LOS for short) transmission environment, and a non-line-of-sight (NLOS for short) transmission environment is not considered.

In an existing positioning method, detection is performed based on positioning measurement information between a plurality of base stations and one terminal. This has a relatively high requirement on network synchronization, and positioning accuracy depends on a transmission status of a channel. Therefore, the positioning accuracy is greatly affected by an environment. As large-bandwidth communication and massive MIMO technologies are used in a 5G system, multipath reflection components (a TOA and an AOA) in an NLOS environment may be detected and identified. Currently, however, there is no specific definition or solution for how to implement positioning measurement that is based on a single base station and what actions will be performed by a device in a network during the implementation, to avoid a problem that a plurality of base stations have strict requirements on time and data synchronization. Therefore, an interaction procedure solution required for positioning is required, to position a terminal device.

SUMMARY

This disclosure provides a method, an apparatus, a device, and a system for positioning a terminal device, to position a terminal device through positioning measurement that is based on a single access node.

According to a first aspect, a method and an apparatus for positioning a terminal device are provided.

In a possible implementation, the method is applied to a terminal device side, to position a terminal device through positioning measurement that is based on a single access node. The method includes: obtaining, by the terminal device, positioning measurement information for the terminal device, where the positioning measurement information is measurement result information of multipath positioning measurement that is based on the single access node and that is performed based on a positioning reference signal sent by the single access node; and after obtaining the positioning measurement information, sending, by the terminal device, the positioning measurement information to a positioning service function entity. After receiving the positioning measurement information, the positioning service function entity may perform location estimation on the terminal device based on the positioning measurement information, to position the terminal device.

It may be understood that, to obtain the positioning measurement information, optionally, before obtaining the positioning measurement information, the terminal device further receives the positioning reference signal sent by the single access node, and obtains the positioning measurement information based on the positioning reference signal.

In this implementation, the terminal device can report the measurement result information of the multipath positioning measurement that is based on the single access node to the positioning service function entity, to implement positioning through multipath measurement, and avoid a problem that a plurality of base stations have a strict requirement on time and data synchronization. This technical solution may be applied to terminal device positioning in a non-line-of-sight NLOS transmission environment.

In a possible implementation, before obtaining the positioning measurement information for the terminal device, the terminal device further needs to enable the positioning service function entity to learn of a measurement capability supported by the terminal device, and send device capability indication information of the terminal device to the positioning service function entity, to indicate whether the terminal device supports the multipath positioning measurement that is based on the single access node. In an environment in which a system supports a plurality of types of positioning measurement, this implementation can enable the positioning service function entity to determine a positioning measurement manner that can be supported by the terminal device, thereby effectively implementing positioning.

In a possible implementation, before obtaining the positioning measurement information for the terminal device, the terminal device further receives a location information request sent by the positioning service function entity, obtains the positioning measurement information based on the location information request, and reports the positioning measurement information to the positioning service function entity. In this implementation, the terminal device can report the positioning measurement information based on the request of the positioning service function entity, thereby reducing unnecessary reporting overheads.

Correspondingly, an apparatus for positioning a terminal device is provided. The apparatus can implement the corresponding positioning method according to the first aspect. For example, the apparatus is limited in a functional form. A specific implementation of the apparatus may be a positioning device. For example, the apparatus may be a terminal device, or a chip or a functional module in a terminal device. The foregoing method may be implemented by software or hardware, or by hardware executing corresponding software.

In a possible implementation, the apparatus may include a processor and a memory. The processor is configured to support the apparatus in executing a corresponding function in the method according to the first aspect. The memory is configured to couple to the processor, and stores a program (instruction) and data that are necessary to the apparatus. In addition, the apparatus may further include a communications interface, configured to support communication between the apparatus and another network element. The communications interface may be a transceiver.

In a possible implementation, the apparatus may include a sending unit. The sending unit is configured to send the positioning measurement information to the positioning service function entity. The apparatus may further include a processing unit. The processing unit is configured to obtain the positioning measurement information for the terminal device.

According to a second aspect, a method and an apparatus for positioning a terminal device are provided.

In a possible implementation, the method is applied to a terminal device side, to position a terminal device through positioning measurement of a single access node. The method includes: sending, by the terminal device to a positioning service function entity, positioning measurement information for the terminal device, where the positioning measurement information is measurement result information of multipath positioning measurement that is based on the single access node and that is performed based on a positioning reference signal sent by the single access node. After receiving the positioning measurement information, the positioning service function entity may perform location estimation on the terminal device based on the positioning measurement information, to position the terminal device.

It may be understood that, to obtain the positioning measurement information, optionally, before obtaining the positioning measurement information, the terminal device further receives the positioning reference signal sent by the single access node, and obtains the positioning measurement information based on the positioning reference signal.

In this implementation, the terminal device can report the measurement result information of the multipath positioning measurement that is based on the single access node to the positioning service function entity, to implement positioning through multipath measurement, and avoid a problem that a plurality of base stations have a strict requirement on time and data synchronization. This technical solution may be applied to terminal device positioning in a non-line-of-sight NLOS transmission environment.

In a possible implementation, before reporting the positioning measurement information, the terminal device further needs to enable the positioning service function entity to learn of a measurement capability supported by the terminal device, and send device capability indication information of the terminal device to the positioning service function entity, to indicate whether the terminal device supports the multipath positioning measurement that is based on the single access node. In an environment in which a system supports a plurality of types of positioning measurement, this implementation can enable the positioning service function entity to determine a positioning measurement manner that can be supported by the terminal device, thereby effectively implementing positioning.

In a possible implementation, before reporting the positioning measurement information, the terminal device further receives a location information request sent by the positioning service function entity, obtains the positioning measurement information based on the location information request, and reports the positioning measurement information to the positioning service function entity. In this implementation, the terminal device can report the positioning measurement information based on the request of the positioning service function entity, thereby reducing unnecessary reporting overheads.

Correspondingly, an apparatus for positioning a terminal device is provided. The apparatus can implement the corresponding positioning method according to the second aspect. For example, the apparatus is limited in a functional form. A specific implementation of the apparatus may be a positioning device. The apparatus is specifically a terminal device, or may be a chip or a functional module in a terminal device. The foregoing method may be implemented by software or hardware, or by hardware executing corresponding software.

In a possible implementation, the apparatus may include a processor and a memory. The processor is configured to support the apparatus in executing a corresponding function in the method according to the second aspect. The memory is configured to couple to the processor, and stores a program (instruction) and data that are necessary to the apparatus. In addition, the apparatus may further include a communications interface, configured to support communication between the apparatus and another network element. The communications interface may be a transceiver.

In a possible implementation, the apparatus may include a sending unit. The sending unit is configured to send the positioning measurement information to the positioning service function entity. Optionally, the apparatus may further include a processing unit. The processing unit is configured to obtain the positioning measurement information for the terminal device.

According to a third aspect, a method and an apparatus for positioning a terminal device are provided.

In a possible implementation, the method may be applied to an access node side such as a base station, an evolved universal terrestrial radio access network NodeB (E-UTRAN NodeB, eNB for short) or a new radio access network NodeB (NR NodeB for short), to position a terminal device through positioning measurement of a single access node. The method includes: obtaining, by an access node, positioning measurement information for the terminal device, where the positioning measurement information is measurement result information of multipath positioning measurement that is based on the single access node and that is performed based on a positioning reference signal sent by the terminal device; and after obtaining the positioning measurement information, sending, by the access node, the positioning measurement information to a positioning service function entity. After receiving the positioning measurement information, the positioning service function entity may perform location estimation on the terminal device based on the positioning measurement information, to position the terminal device.

It may be understood that, to obtain the positioning measurement information, optionally, before obtaining the positioning measurement information, the access node further receives the positioning reference signal sent by the terminal device, and obtains the positioning measurement information based on the positioning reference signal.

In this implementation, the access node can report the measurement result information of the multipath positioning measurement that is based on the single access node to the positioning service function entity, to implement positioning through multipath measurement, and avoid a problem that a plurality of base stations have a strict requirement on time and data synchronization. This technical solution may be applied to terminal device positioning in a non-line-of-sight NLOS transmission environment.

In a possible implementation, before obtaining the positioning measurement information for the terminal device, the access node further needs to enable the positioning service function entity to learn of a measurement capability supported by the access node, and send device capability indication information of the access node to the positioning service function entity, to indicate whether the access node supports the multipath positioning measurement that is based on the single access node. In an environment in which a system supports a plurality of types of positioning measurement, this implementation can enable the positioning service function entity to determine a positioning measurement manner that can be supported by the access node, thereby effectively implementing positioning.

In a possible implementation, before obtaining the positioning measurement information for the terminal device, the access node further receives a location information request sent by the positioning service function entity, obtains the positioning measurement information based on the location information request, and reports the positioning measurement information to the positioning service function entity. In this implementation, the access node can report the positioning measurement information based on the request of the positioning service function entity, thereby reducing unnecessary reporting overheads.

Correspondingly, an apparatus for positioning a terminal device is provided. The apparatus can implement the corresponding positioning method according to the third aspect. For example, the apparatus is limited in a functional form. A specific implementation of the apparatus may be a positioning device. The apparatus is specifically an access node, or may be a chip or a functional module in an access node. The foregoing method may be implemented by software or hardware, or by hardware executing corresponding software.

In a possible implementation, the apparatus may include a processor and a memory. The processor is configured to support the apparatus in executing a corresponding function in the method according to the third aspect. The memory is configured to couple to the processor, and stores a program (instruction) and data that are necessary to the apparatus. In addition, the apparatus may further include a communications interface, configured to support communication between the apparatus and another network element. The communications interface may be a transceiver.

In a possible implementation, the apparatus may include a sending unit. The sending unit is configured to send the positioning measurement information to the positioning service function entity. The apparatus may further include a processing unit. The processing unit is configured to obtain the positioning measurement information for the terminal device.

According to a fourth aspect, a method and an apparatus for positioning a terminal device are provided.

In a possible implementation, the method may be applied to an access node side such as a base station, an evolved universal terrestrial radio access network NodeB (E-UTRAN NodeB, eNB for short) or a new radio access network NodeB (NR NodeB for short), to position a terminal device through positioning measurement of a single access node. The method includes: sending, by an access node to a positioning service function entity, positioning measurement information for the terminal device, where the positioning measurement information is measurement result information of multipath positioning measurement that is based on the single access node and that is performed based on a positioning reference signal sent by the terminal device. After receiving the positioning measurement information, the positioning service function entity may perform location estimation on the terminal device based on the positioning measurement information, to position the terminal device.

It may be understood that, to obtain the positioning measurement information, optionally, before obtaining the positioning measurement information, the access node further receives the positioning reference signal sent by the terminal device, and obtains the positioning measurement information based on the positioning reference signal.

In this implementation, the access node can report the measurement result information of the multipath positioning measurement that is based on the single access node to the positioning service function entity, to implement positioning through multipath measurement, and avoid a problem that a plurality of base stations have a strict requirement on time and data synchronization. This technical solution may be applied to terminal device positioning in a non-line-of-sight NLOS transmission environment.

In a possible implementation, before reporting the positioning measurement information, the access node further needs to enable the positioning service function entity to learn of a measurement capability supported by the access node, and send device capability indication information of the access node to the positioning service function entity, to indicate whether the access node supports the multipath positioning measurement that is based on the single access node. In an environment in which a system supports a plurality of types of positioning measurement, this implementation can enable the positioning service function entity to determine a positioning measurement manner that can be supported by the access node, thereby effectively implementing positioning.

In a possible implementation, before reporting the positioning measurement information, the access node further receives a location information request sent by the positioning service function entity, obtains the positioning measurement information based on the location information request, and reports the positioning measurement information to the positioning service function entity. In this implementation, the access node can report the positioning measurement information based on the request of the positioning service function entity, thereby reducing unnecessary reporting overheads.

Correspondingly, an apparatus for positioning a terminal device is provided. The apparatus can implement the corresponding positioning method according to the fourth aspect. For example, the apparatus is limited in a functional form. A specific implementation of the apparatus may be a positioning device. The apparatus is specifically an access node, or may be a chip or a functional module in an access node. The foregoing method may be implemented by software or hardware, or by hardware executing corresponding software.

In a possible implementation, the apparatus may include a processor and a memory. The processor is configured to support the apparatus in executing a corresponding function in the method according to the fourth aspect. The memory is configured to couple to the processor, and stores a program (instruction) and data that are necessary to the apparatus. In addition, the apparatus may further include a communications interface, configured to support communication between the apparatus and another network element. The communications interface may be a transceiver.

In a possible implementation, the apparatus may include a sending unit. The sending unit is configured to send the positioning measurement information to the positioning service function entity. Optionally, the apparatus may further include a processing unit. The processing unit is configured to obtain the positioning measurement information for the terminal device.

According to a fifth aspect, a method and an apparatus for positioning a terminal device are provided.

In a possible implementation, the method may be applied to a positioning service function entity such as a positioning service center or an enhanced serving mobile location center (E-SMLC for short), to position a terminal device based on a single access node. The method includes: determining that a device capability of a measurement device supports the multipath positioning measurement that is based on the single access node, where the measurement device includes an access node and/or a terminal device that is to be positioned, and the access node is a single access node configured to position the terminal device; and receiving positioning measurement information sent by the measurement device for the terminal device, where the positioning measurement information is multipath positioning measurement information that is based on the single access node. The positioning service function entity can perform location estimation on the terminal device based on the positioning measurement information. It may be understood that, in an environment in which a system supports a plurality of types of positioning measurement, before providing a positioning service, the positioning service function entity needs to determine a positioning measurement manner that can be supported by the measurement device, to effectively implement positioning. The positioning service function entity may perform terminal location estimation based on positioning measurement information reported by the terminal device that is to be positioned, or may perform terminal location estimation based on positioning measurement information reported by the corresponding access node, or may perform terminal location estimation based on positioning measurement information reported by both the terminal device and the access node.

In this implementation, the positioning service function entity can receive measurement result information of the multipath positioning measurement that is based on the single access node and that is reported by the measurement device, to implement positioning through multipath measurement, and avoid a problem that a plurality of base stations have a strict requirement on time and data synchronization. This technical solution may be applied to terminal device positioning in a non-line-of-sight NLOS transmission environment.

In a possible implementation, before determining that the device capability of the measurement device supports the multipath positioning measurement that is based on the single access node, the positioning service function entity may send a positioning capability request to the measurement device and/or a device capability register function entity, receive device capability indication information of the measurement device returned by the measurement device and/or the device capability register function entity, and perform determining based on the device capability indication information, where the device capability indication information is used to indicate whether the measurement device supports the multipath positioning measurement that is based on the single access node.

In a possible implementation, if the measurement device includes the terminal device, to implement positioning, the positioning service function entity sends a first message to the access node, where the first message is used to instruct the access node to send a positioning reference signal to the terminal device; and the terminal device performs, based on the positioning reference signal, the multi-path positioning measurement that is based on the single access node, so that the positioning service function entity can further obtain the positioning measurement information reported by the terminal device.

If the measurement device includes the access node, to implement positioning, the positioning service function entity sends a second message to the terminal device, where the second message is used to instruct the terminal device to send a positioning reference signal to the access node; and the access node performs, based on the positioning reference signal, the multi-path positioning measurement that is based on the single access node, so that the positioning service function entity can further obtain the positioning measurement information reported by the access node.

In this implementation, the measurement device can send, according to an instruction of the positioning service function entity, a signal related to positioning measurement, thereby reducing unnecessary overheads.

In a possible implementation, after determining that the device capability of the measurement device supports the multipath positioning measurement that is based on the single access node, the positioning service function entity sends a location information request to the measurement device; and the measurement device obtains the positioning measurement information based on the location information request, and reports the positioning measurement information to the positioning service function entity. In this implementation, the measurement device can report the positioning measurement information based on the request of the positioning service function entity, thereby reducing unnecessary reporting overheads.

Correspondingly, an apparatus for positioning a terminal device is provided. The apparatus can implement the corresponding positioning method according to the fifth aspect. For example, the apparatus is limited in a functional form. A specific implementation of the apparatus may be a positioning device or a positioning service function entity, or may be a chip or a functional module in a positioning device or a positioning service function entity. The foregoing method may be implemented by software or hardware, or by hardware executing corresponding software.

In a possible implementation, the apparatus may include a processor and a memory. The processor is configured to support the apparatus in executing a corresponding function in the method according to the fifth aspect. The memory is configured to couple to the processor, and stores a program (instruction) and data that are necessary to the apparatus. In addition, the apparatus may further include a communications interface, configured to support communication between the apparatus and another network element. The communications interface may be a transceiver.

In a possible implementation, the apparatus may include a receiving unit. The receiving unit is configured to receive the positioning measurement information sent by the measurement device for the terminal device. The apparatus may further include a processing unit. The processing unit is configured to determine that the device capability of the measurement device supports the multipath positioning measurement that is based on the single access node.

According to a sixth aspect, a method and an apparatus for positioning a terminal device are provided.

In a possible implementation, the method may be applied to a positioning service function entity such as a positioning service center or an enhanced serving mobile location center (E-SMLC for short), to position a terminal device based on a single access node. The method includes: receiving positioning measurement information sent by a measurement device for the terminal device, where the positioning measurement information is multipath positioning measurement information that is based on the single access node, the measurement device includes an access node and/or the terminal device that is to be positioned, and the access node is a single access node configured to position the terminal device. The positioning service function entity can perform location estimation on the terminal device based on the positioning measurement information. It may be understood that the positioning service function entity may perform terminal location estimation based on positioning measurement information reported by the terminal device that is to be positioned, or may perform terminal location estimation based on positioning measurement information reported by the corresponding access node, or may perform terminal location estimation based on positioning measurement information reported by both the terminal device and the access node.

In this implementation, the positioning service function entity can receive measurement result information of the multipath positioning measurement that is based on the single access node and that is reported by the measurement device, to implement positioning through multipath measurement, and avoid a problem that a plurality of base stations have a strict requirement on time and data synchronization. This technical solution may be applied to terminal device positioning in a non-line-of-sight NLOS transmission environment.

In a possible implementation, before receiving the positioning measurement information sent by the measurement device for the terminal device, the positioning service function entity further needs to first determine that a device capability of the measurement device supports the multipath positioning measurement that is based on the single access node. Optionally, the positioning service function entity may send a positioning capability request to the measurement device and/or a device capability register function entity, receive device capability indication information of the measurement device returned by the measurement device and/or the device capability register function entity, and perform determining based on the device capability indication information, where the device capability indication information is used to indicate whether the measurement device supports the multipath positioning measurement that is based on the single access node. In an environment in which a system supports a plurality of types of positioning measurement, this implementation can enable the positioning service function entity to determine, when providing a positioning service, a positioning measurement manner that can be supported by the measurement device, thereby effectively implementing positioning.

In a possible implementation, if the measurement device includes the terminal device, to implement positioning, the positioning service function entity sends a first message to the access node, where the first message is used to instruct the access node to send a positioning reference signal to the terminal device; and the terminal device performs, based on the positioning reference signal, the multi-path positioning measurement that is based on the single access node, so that the positioning service function entity can further obtain the positioning measurement information reported by the terminal device.

If the measurement device includes the access node, to implement positioning, the positioning service function entity sends a second message to the terminal device, where the second message is used to instruct the terminal device to send a positioning reference signal to the access node; and the access node performs, based on the positioning reference signal, the multi-path positioning measurement that is based on the single access node, so that the positioning service function entity can further obtain the positioning measurement information reported by the access node.

In this implementation, the measurement device can send, according to an instruction of the positioning service function entity, a signal related to positioning measurement, thereby reducing unnecessary overheads.

In a possible implementation, after determining that the device capability of the measurement device supports the multipath positioning measurement that is based on the single access node, the positioning service function entity sends a location information request to the measurement device; and the measurement device obtains the positioning measurement information based on the location information request, and reports the positioning measurement information to the positioning service function entity. In this implementation, the measurement device can report the positioning measurement information based on the request of the positioning service function entity, thereby reducing unnecessary reporting overheads.

Correspondingly, an apparatus for positioning a terminal device is provided. The apparatus can implement the corresponding positioning method according to the sixth aspect. For example, the apparatus is limited in a functional form. A specific implementation of the apparatus may be a positioning device or a positioning service function entity, or may be a chip or a functional module in a positioning device or a positioning service function entity. The foregoing method may be implemented by software or hardware, or by hardware executing corresponding software.

In a possible implementation, the apparatus may include a processor and a memory. The processor is configured to support the apparatus in executing a corresponding function in the method according to the sixth aspect. The memory is configured to couple to the processor, and stores a program (instruction) and data that are necessary to the apparatus. In addition, the apparatus may further include a communications interface, configured to support communication between the apparatus and another network element. The communications interface may be a transceiver.

In a possible implementation, the apparatus may include a receiving unit. The receiving unit is configured to receive the positioning measurement information sent by the measurement device for the terminal device. Optionally, the apparatus may further include a processing unit. The processing unit is configured to determine that the device capability of the measurement device supports the multipath positioning measurement that is based on the single access node.

Based on any one of the technical solutions provided in the first aspect, the second aspect, the third aspect, the fourth aspect, the fifth aspect, or the sixth aspect, in a possible implementation, the multipath positioning measurement includes positioning measurement for a main path and at least one reflection path, or positioning measurement for at least two reflection paths, where the positioning measurement includes at least one of the following: measurement on a time of arrival TOA used for distance positioning and measurement on an angle of arrival AOA used for angle positioning. It may be understood that there are two cases of multipath. One is a multipath formed by a main path used as a direct path between an access node and a terminal device and a multipath formed by at least one reflection path used as a path that runs through a reflector and that is between the access node and the terminal device, and the other is a multipath formed by at least two reflection paths. The access node is a single access node, and there may be one or more reflectors.

This disclosure further provides a computer storage medium. The computer storage medium stores a computer program (instruction). When the program (instruction) runs on a computer, the computer is enabled to perform the method according to any one of the foregoing aspects.

This disclosure further provides a computer program product. When the computer program product runs on a computer, the computer is enabled to perform the method according to any one of the foregoing aspects.

This disclosure further provides a chip. The chip stores an instruction. When the instruction is run on a communications device, a communications device is enabled to perform the corresponding methods in the foregoing aspects.

This disclosure further provides an apparatus for positioning a terminal. The apparatus includes a memory, a processor, and a computer program that is stored in the memory and that can run on the processor. When executing the computer program, the processor implements the corresponding methods in the foregoing aspects.

This disclosure further provides an apparatus for positioning a terminal. The apparatus includes a processor. The processor is configured to: couple to a memory, read an instruction in the memory, and implement, based on the instruction, the corresponding methods in the foregoing aspects. It may be understood that the memory may be integrated into the processor, or may exist independent of the processor.

This disclosure further provides an apparatus for positioning a terminal device. The apparatus includes a processor. The processor is configured to implement the corresponding methods in the foregoing aspects when executing a computer program.

This disclosure further provides a system for positioning a terminal device. The system includes the foregoing positioning service function entity and the terminal device and/or the access node. These components of the system separately implement the corresponding methods in the foregoing aspects.

It may be understood that any apparatus, computer storage medium, computer program product, chip, or system for positioning a terminal provided above is configured to implement a corresponding method provided above. Therefore, for a beneficial effect that can be achieved by the apparatus, computer storage medium, computer program product, chip, or system, refer to a beneficial effect of the corresponding method, and details are not described herein again.

BRIEF DESCRIPTION OF DRAWINGS

To describe technical solutions in embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from the embodiments of this disclosure and these accompanying drawings without creative efforts.

DESCRIPTION OF EMBODIMENTS

Figure 1A:
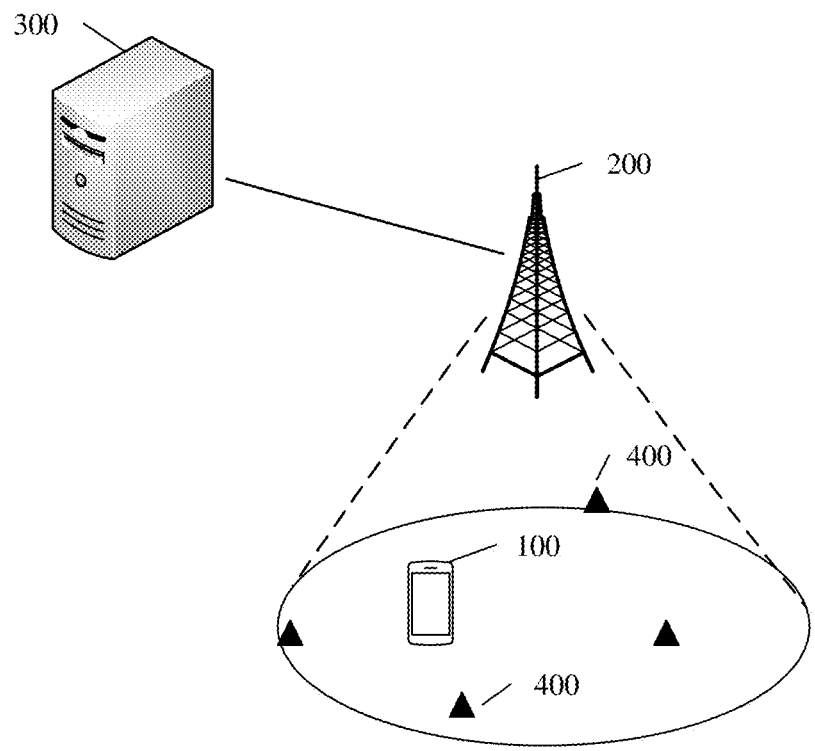
FIG. 1a shows a network system architecture according to this disclosure.

To make technical problems to be resolved in this disclosure, the technical solutions used in this disclosure, and the technical effects achieved in this disclosure clearer, the following further describes in detail the technical solutions in this disclosure in form of embodiments with reference to the accompanying drawings. The detailed description provides various embodiments of a device and a process by using one or more of block diagrams, flowcharts, and examples. These block diagrams, flowcharts, or examples include one or more functions and/or operations. Therefore, a person skilled in the art may understand that each function and/or operation in the block diagrams, the flowcharts, or the examples may be performed independently or jointly by using much hardware, software, and firmware, or any combination thereof.

"A plurality of" in this disclosure refers to two or more than two. The term "and/or" in this disclosure describes merely an association relationship for describing associated objects and represents that three relationships may exist. For example, A and/or B may represent the following three cases: Only A exists, both A and B exist, and only B exists. In addition, the character "I" in this specification generally indicates an "or" relationship between the associated objects. In this disclosure, the terms "first", "second", "third", "fourth", and the like are intended to distinguish between different objects but do not indicate a particular order of the objects.

In this disclosure, nouns "network" and "system" are usually interchangeably used, but a person skilled in the art can understand meanings of the nouns. In some cases, all "terminals"/"terminal devices" mentioned in this disclosure may be mobile devices, for example, a mobile phone, a personal digital assistant, a handheld or laptop computer, and a similar device having a telecommunications capability. In some other cases, the "terminals"/"terminal devices" may alternatively be wearable devices, vehicle-mounted devices, or the like, and include a terminal in a 5G network, a terminal in a future evolved public land mobile network (Public Land Mobile Network, PLMN for short), and the like. Such a terminal may include a device and a removable storage module associated with the device (for example, but not limited to, a subscriber identification module (SIM for short) application, a universal subscriber identification module (USIM for short) application, or a universal integrated circuit card (UICC for short) of a removable user identity module (R-USIM for short)). Alternatively, such a terminal may include a device that does not have the module. In another case, the term "terminal"/"terminal device" may refer to a non-portable device having a similar capability, for example, a desktop computer, a set-top box, or a network device. The term "terminal"/"terminal device" may further be any hardware or software component that can terminate a communication session of a user. In addition, "user terminal", "user equipment", "UE", "site", "station", "STA", "user equipment", "user agent", "user agent", "UA", "user apparatus", "mobile device", and "device", and the like are substitutive terms that are synonymous with "terminal"/ "terminal device" in this specification. For ease of description, in this disclosure, the foregoing devices are collectively referred to as user equipment or UE.

The "access node" mentioned in this disclosure is a network device, and is an apparatus deployed in a radio access network to provide a wireless communication function for a terminal device. The access node may include various forms of macro base stations, micro base stations, relay stations, access points, and the like, including systems and devices for improving peer devices in a conventional wireless telecommunications system. Such an advanced or next-generation device may be included in a long term evolution LTE communications system, a 5G communications system, a future evolved system, or a plurality of communications convergence systems, for example, an evolved universal terrestrial radio access network NodeB (E-UTRAN NodeB, eNB for short) included in an LTE system, a new radio access network NodeB (NR NodeB for short) included in 5G, another radio access point, or a similar component. In systems using different radio access technologies, names of devices having an access node function may be different. For ease of description, in this disclosure, the foregoing apparatuses providing a wireless communication function for UE are collectively referred to as access nodes.

In this disclosure, the term "positioning service function entity" is a function entity that provides a positioning service for UE, and may be a service function entity or a higher layer service function entity disposed independent of an access node, or may be a service function entity disposed on an access node. Any entity that can implement a related function is a "positioning service function entity". In different systems and at different disposed positions, entity names of entities that have a function of a positioning service function entity may be different, for example, "positioning service center" and "enhanced serving mobile location center (E-SMLC for short)". For ease of description, in this disclosure, the foregoing entities that provide a positioning service for UE are collectively referred to as positioning service function entities.

Figure 1B:
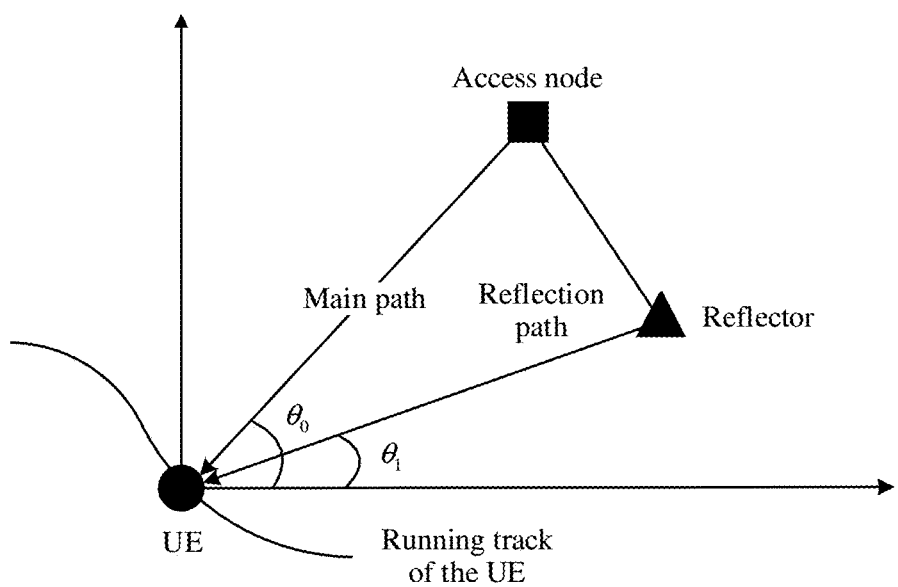
FIG. 1b is a schematic diagram of angles of arrival AOA of a main path and a reflection path according to this disclosure.
Figure 1C:
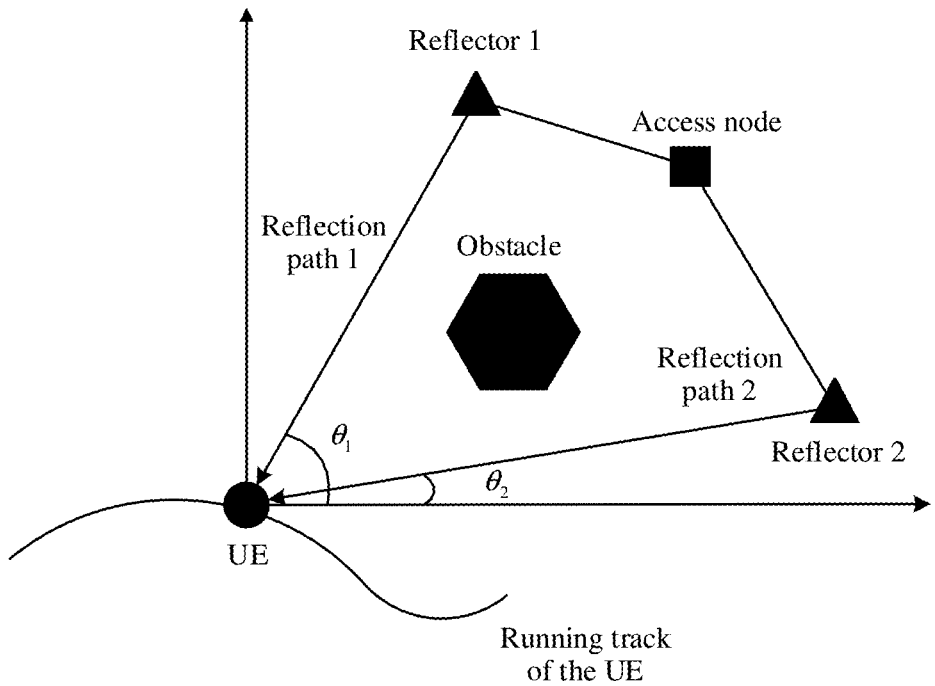
FIG. 1c is a schematic diagram of angles of arrival AOA of at least two reflection paths according to this disclosure.

FIG. 1a shows an architecture of a network system according to this disclosure. The system is configured to position UE, and includes UE 100, an access node 200, a positioning service function entity 300, and a reflector 400. In the system shown in FIG. 1a, for ease of function description division, a schematic diagram of separate dispositions of the positioning service function entity 300 and the access node 200 is provided. However, this is not a limitation on a relationship between the positioning service function entity 300 and the access node 200. A positioning service function may be configured on the access node 200, and the positioning service function entity 300 may be disposed on the access node 200. In an environment in which an electromagnetic wave propagates, there are obstacles such as a building and a natural landscape that affect the propagation of the electromagnetic wave. These obstacles are collectively referred to as reflectors 400, or may be referred to as scatters. Therefore, as shown in FIG. 1a, a propagation path of an electromagnetic wave received by the UE 100 may be classified into two types of paths. One type is a main path (a path from the access node 200 directly to the UE 100) corresponding to the access node 200 near the UE 100, and the other type is at least one reflection path (a path from the access node 200 to the reflector 400, and then from the reflector 400 to the UE 100) corresponding to the reflector 400. In this disclosure, in a system for positioning the UE 100, the access node 200 is a single access node for positioning the UE 100. However, it should be noted that the access node 200 is not necessarily an access node 200 that has been accessed by the UE 100. In this disclosure, positioning measurement is multipath positioning measurement for a single access node, the multipath positioning measurement includes positioning measurement for a main path and at least one reflection path, or positioning measurement for at least two reflection paths, where the positioning measurement may relate to measurement on a time of arrival TOA used for distance positioning and measurement on an angle of arrival AOA used for angle positioning. For an angle of arrival AOA, refer to schematic diagrams of AOAs in different positioning measurement scenarios shown in FIG. 1b and FIG. 1c. FIG. 1b is a schematic diagram of angles of arrival AOA of a main path and a reflection path. FIG. 1c is a schematic diagram of angles of arrival AOA of at least two reflection paths. As shown in FIG. 1b, the circle represents a location of UE, the square represents a location of an access node, and the triangle represents a location of a reflector. The access node transmits a signal, and the UE receives the signal. Some signals sent by the access node are directly transmitted to the UE in the air, and the propagation path is a direct path, that is, a main path. Some signals are reflected by the reflector and then received by the UE, and this path is a reflection path. Using the UE as the coordinate origin, an angle of the direct path for receiving is $\theta_0$, namely, an AOA of the main path; and an angle of the reflection path for receiving is $\theta_1$, namely, an AOA of the reflection path. In FIG. 1c, the circle represents a location of UE, the square represents a location of an access node, and the triangles represent locations of reflectors. The access node transmits a signal, and the UE receives the signal. Signals sent by the access node are not directly transmitted to the UE due to an obstacle. Some signals are received by the UE after being reflected by a reflector 1, and this path is a reflection path 1. Some signals are reflected by a reflector 2 and then received by the UE, and this path is a reflection path 2. Using the UE as the coordinate origin, an angle of the reflection path 1 for receiving is θ₁, namely, an AOA of the reflection path 1; and an angle of the reflection path for receiving is θ₂, namely, an AOA of the reflection path 2. FIG. 1b and FIG. 1c are schematic diagrams of an AOA corresponding to a signal path from an access node to UE. An angle of arrival from the UE to the access node is similar to this, and details are not described again.

FIG. 1a is a schematic diagram of a signal in a downlink direction in which the UE 100 performs positioning measurement. This is not limited in this disclosure, and is merely an example of a scenario. The positioning measurement may be performed by only the UE 100, or may be performed by only the access node 200, or may be performed by the UE 100 and the access node 200 together. In a scenario in which the UE 100 performs the positioning measurement, the UE 100 detects, by using a multi-antenna technology, different angles of arrival (AOAs for short) and/or times of arrival (TOAs for short) of a same signal by receiving a positioning reference signal that is based on a single access node 200 in a downlink direction, to obtain measurement values of multipath AOAs and/or TOAs. In a scenario in which the access node 200 performs the positioning measurement, the single access node 200 detects, by using a multi-antenna technology, different angles of arrival and/or times of arrival of a same signal by receiving a positioning reference signal sent by the UE 100 that is to be positioned in an uplink direction, to obtain measurement values of multipath AOAs and/or TOAs. In a scenario in which the UE 100 and the access node 200 perform positioning measurement together, the UE 100 and the access node 200 respectively obtain measurement values of multipath AOAs and/or TOAs that are measured in a downlink direction and an uplink direction.

The UE 100 and/or the access node 200 report/reports the measurement values of the multipath AOAs and/or TOAs to the positioning service function entity 300 (where the UE 100 is in communication connection with the positioning service function entity 300 by using the access node 200). After obtaining the measurement values of the multipath AOAs and/or TOAs reported by the UE 100 and/or the access node 200, the positioning service function entity 300 can perform location estimation on the UE 100, to position the UE 100. It should be noted that if a location of the reflector 400 is known, a calculation result of the location estimation is more accurate.

It should be noted that, FIG. 1a shows merely an example of the architecture of the network system in this disclosure, and this disclosure is not limited thereto. Similarly, this disclosure may be further applied to an IEEE802.11 system, and positioning accuracy of indoor wireless fidelity Wi-Fi™ for short) is improved by using multipath measurement information that is based on a single access point (AP for short).

Embodiment 1

Figure 2:
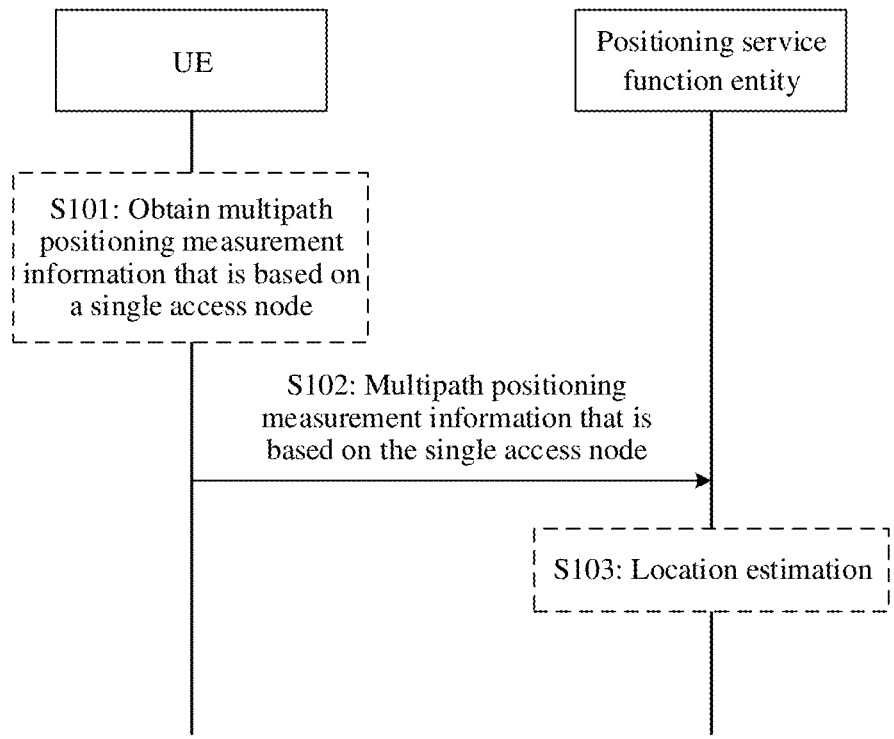
FIG. 2 is a flowchart of a first embodiment of a method for positioning a terminal device according to this disclosure.

According to this embodiment of this disclosure, FIG. 2 is a flowchart of a first embodiment of a method for positioning a terminal device according to this disclosure. For ease of understanding of the solution, during description, this embodiment and subsequent embodiments are described as a whole from a perspective of a plurality of interaction parties. However, it is not limited that steps on all interaction sides in a system need to be performed together. The technical solution provided in this disclosure is improved on each side of the system.

The method includes the following steps.

S101: UE obtains multipath positioning measurement information that is based on a single access node.

The UE may obtain the positioning measurement information from an entity capable of performing positioning measurement, or the UE may obtain the positioning measurement information by directly performing positioning measurement. Specifically, the positioning measurement is multipath positioning measurement that is based on the single access node and that is performed based on a positioning reference signal sent by the single access node. The positioning measurement information is measurement result information of the multipath positioning measurement that is based on the single access node.

The positioning measurement that is based on the single access node needs to be implemented in combination with the multi-path positioning measurement. A multipath includes a main path corresponding to the single access node and at least one reflection path corresponding to a reflector, or at least two reflection paths corresponding to reflectors, where there are at least two reflectors in the system. However, it should be noted that, if there are a plurality of reflection paths, the plurality of reflection paths include reflection paths respectively corresponding to a plurality of reflectors, and also include a plurality of reflection paths corresponding to one reflector in a plurality of times of measurement. In addition, the single access node is not necessarily an access node that has been accessed by the UE. The single access node may be an access node near the UE, and is configured to position the UE. The UE may detect an AOA and/or a TOA of a same signal (a downlink positioning reference signal) by using a multi-antenna technology, to obtain measurement values of a multipath AOA and/or TOA.

Optionally, the TOA and the AOA may be determined in the following manners:

(a). For estimation on the measurement value of the TOA, assuming that a propagation time of the positioning reference signal between the single access node and the UE is $t_{prop}$, a propagation distance of the signal is $L=c*t_{prop}$, where c represents a speed of light. A receiving timestamp of the UE may be expressed as:

$$t=t_{ms}+t_{prop}+\varepsilon_{sync}$$

where $t_{ms}$ represents a timestamp of sending the positioning reference signal by the single access node, $t_{prop}$ represents the propagation time of the signal, and $\varepsilon_{sync}$ is a time synchronization error between the UE and the single access node. Based on this estimation manner, the measurement value of the multipath TOA is obtained by detecting different times of arrival of a same signal.

(b). For estimation on the measurement value of the AOA, an angle of arrival AOA of the positioning reference signal to the UE may be expressed as:

$$\theta = \text{ac tan}\left(\frac{y_{BS} - y_{UE}}{x_{BS} - x_{UE}}\right) + \varepsilon_{AOA}$$

where $[x_{BS}, y_{BS}]$ and $[y_{UE}, y_{UE}]$ are respectively coordinates of the single access node and the UE, and $\varepsilon_{AOA}$ is measurement noise. Based on this estimation manner, the measurement value of the multipath AOA is obtained by detecting different angles of arrival of the same signal.

Optionally, the UE may periodically obtain the positioning measurement information, or may obtain the positioning measurement information based on triggering of a request sent by the positioning service function entity or triggering of a positioning reference signal sent by the access node.

S102: The UE sends the multipath positioning measurement information that is based on the single access node to the positioning service function entity, and the positioning service function entity receives the positioning measurement information.

Through signaling interaction between the UE and the positioning service function entity, the UE sends a message carrying the positioning measurement information to the positioning service function entity, so that the positioning service function entity obtains the measurement result information of the multipath positioning measurement that is based on the single access node. Optionally, in different systems, the UE may add, to different messages, the multipath positioning measurement information that is based on the single access node. For example, in an LTE system, point-to-point bidirectional transfer between a target device (UE) and a positioning service function entity may be implemented by using the LTE positioning protocol (LTE Positioning Protocol, LPP for short). The LPP protocol includes transfer of location information (Location Information). Therefore, the positioning measurement information may be carried in an LPP message. It should be noted that the "location information (Location Information)" herein may not only represent actual location estimation on the UE, but also may represent measurement data (for example, TOA and AOA measurement) used for positioning calculation. The foregoing is merely an example. Alternatively, the positioning measurement information may be carried in another message in the LTE system, or the positioning measurement information may be carried in another message in a terminal in a 5G network or a future evolved public land mobile network (PLMN for short).

Optionally, the UE may periodically send the positioning measurement information to the positioning service function entity, or may send the positioning measurement information based on triggering of a request sent by the positioning service function entity or triggering of a positioning reference signal sent by the access node.

S103: The positioning service function entity performs location estimation on the UE based on the received positioning measurement information, to implement positioning.

It is detected that there is multipath information in a scenario, and positioning may be performed by using different reflection paths. The positioning service function entity may optionally perform location estimation in the following manners:

(Solution a). For a multipath including a main path and at least one reflection path, the following processing steps may be included:

preliminarily estimating a location of the UE based on measurement values of a TOA and an AOA of the main path and a known location of the single access node, to obtain a first UE location;

estimating a location of a reflector based on the first UE location, a location of the access node, and measurement values of a TOA and an AOA of the reflection path, where at least one reflector is considered, and when there is more than one reflector, location estimation is separately performed on each of the plurality of reflectors;

repeatedly performing location estimation on the reflector, to obtain a predetermined quantity of location estimation values of the reflector, and calculating an average value of the predetermined quantity of times of location estimation on the reflector, to determine a final estimated location of the reflector, thereby improving precision of location estimation on the reflector, where if there is more than one reflector, repeated location estimation is performed on each reflector, to obtain a final estimated location of each reflector; and performing second location estimation on the UE based on the final estimated location of the reflector, the location of the access node, and the TOA and the AOA of the main path, to determine the location of the UE, where if there is more than one reflector, second estimation is performed on the location of the UE separately for the plurality of reflectors, and finally, the location of the UE is determined based on these estimation results.

The foregoing solution is intended for a case in which the location of the reflector is unknown, and the location of the reflector needs to be estimated. If the location of the reflector in the system is known, positioning accuracy of the UE is further improved. If the location of the reflector is known, related processing of location estimation on the reflector in a processing procedure may be omitted, and the location of the UE may be estimated directly by using the known location of the reflector and the TOA and the AOA of the main path, to determine the location of the UE.

(Solution b). For a multipath including at least two reflection paths (reflection paths of at least two reflectors), the following processing steps may be included:

preliminarily estimating a location of the UE and locations of reflectors based on measurement values of TOAs and AOAs of the reflection paths corresponding to the at least two reflectors, where this step specifically includes: obtaining a time difference between the reflection paths based on the at least two reflection paths; and obtaining estimation values of the location of the UE and locations of the at least two reflectors based on the time difference, the TOAs and the AOAs that correspond to the at least two reflection paths, and the location of the access node;

repeatedly performing reflector location estimation on the at least two reflectors, to obtain a predetermined quantity of location estimation values of the reflectors, and calculating an average value of the predetermined quantity of location estimation values of the reflectors, to determine final estimated locations of the reflectors, so that precision of the location estimation on the reflectors is improved by calculating an average value of a plurality of times of estimation; and performing second estimation on the location of the UE based on the location of the access node, the final estimated locations of the at least two reflectors, and the measurement values of the TOAs and the AOAs of the reflection paths corresponding to the at least two reflectors, to determine the location of the UE.

The foregoing solution is intended for a case in which the locations of the reflectors are unknown, and the locations of the reflectors need to be estimated. If the locations of the reflectors in the system are known, positioning accuracy of the UE is further improved. If the locations of the at least two reflectors are known, related processing of location estimation on the reflectors in a processing procedure may be omitted, and the location of the UE may be estimated directly by using the locations of the at least two reflectors and the measurement values of the TOAs and the AOAs of the reflection paths corresponding to the at least two reflection paths.

It should be noted that, in the foregoing solutions a and b, in one measurement process, one reflector corresponds to one reflection path. In a process in which the UE moves (where certainly, the UE may alternatively be stationary), the positioning reference signal is sent for a plurality of times, so that a plurality of times of measurement may be performed, the plurality of times of reflector location estimation is performed for each reflector. For each reflector, an average value of a plurality of measurement values for the reflector is calculated, to improve estimation precision of the reflector.

According to the method for positioning a terminal device in this embodiment of this disclosure, by using the interaction procedure in which the UE reports the multipath measurement information that is based on the single access node to the positioning service function entity, the UE is accurately positioned, and a problem that a plurality of base stations have a strict requirement on time and data synchronization is avoided.

Embodiment 2

Figure 3:
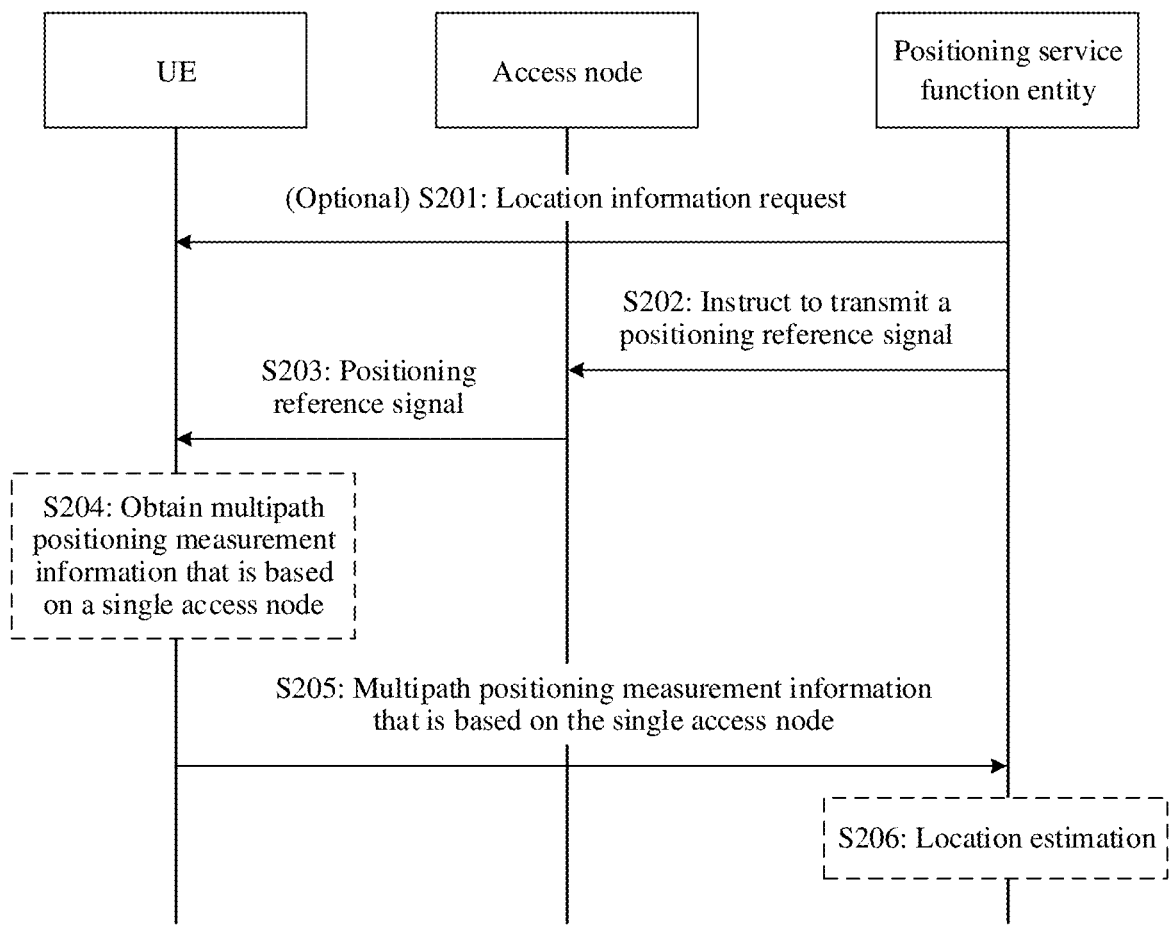
FIG. 3 is a flowchart of a second embodiment of a method for positioning a terminal device according to this disclosure.

FIG. 3 is a flowchart of a second embodiment of a method for positioning a terminal device according to this disclosure. A difference between this embodiment and Embodiment 1 lies in that, in this embodiment, an interaction procedure between an access node and another object is added, and content that is the same as or similar to that in Embodiment 1 is not described in this embodiment again.

The method includes the following steps.

S201: A positioning service function entity sends a location information request to UE.

The interaction procedure is optional, because in a procedure of positioning the UE, optionally, the UE may periodically report the positioning measurement information, or the positioning service function entity may send the location information request to the UE, to trigger the UE to report the positioning measurement information. The positioning service function entity sends the location information request to the UE, to instruct the UE to send positioning measurement information. Triggering may be performed as required, thereby reducing overheads caused by frequent reporting of positioning measurement information by the UE. The location information request may be carried in different messages in different systems. For example, in an LTE system, the location information request may be carried in an LPP message for sending, or may be carried in another message for sending.

S202: The positioning service function entity sends, to the access node, instruction information for instructing the access node to transmit a positioning reference signal.

The positioning service function entity may select an access node near the UE, and send an instruction to the access node, to instruct the access node to send the positioning reference signal to position the UE. Optionally, the instruction may be carried in an LTE positioning protocol annex (LPPa for short) message for sending. This is merely an example. Alternatively, the instruction may be carried in another message in the LTE system, or may be carried in another message in a terminal in a 5G network or a future evolved public land mobile network (PLMN for short).

S203: The access node sends the positioning reference signal to the UE.

Optionally, the positioning reference signal may be a reference signal specially used for positioning, or may be an existing signal such as a PRS or a Cell Specific Reference Signal (CRS). Optionally, that the access node sends the positioning reference signal to the UE may be sending the positioning reference signal to an entity that completes positioning measurement on a UE side. The entity and the UE may be disposed separately.

S204: UE obtains multipath positioning measurement information that is based on a single access node.

For details, refer to step S101 in Embodiment 1. Details are not described herein again. Certainly, this disclosure is not limited thereto.

S205: The UE sends the multipath positioning measurement information that is based on the single access node to the positioning service function entity, and the positioning service function entity receives the positioning measurement information.

For details, refer to step S102 in Embodiment 1. Details are not described herein again. Certainly, this disclosure is not limited thereto.

S206: The positioning service function entity performs location estimation on the UE based on the received positioning measurement information, to implement positioning.

For details, refer to step S103 in Embodiment 1. Details are not described herein again. Certainly, this disclosure is not limited thereto.

According to the method for positioning a terminal device in this embodiment of this disclosure, by using the interaction procedure in which the positioning service function entity instructs the access node to transmit the positioning reference signal, and the UE reports the multipath measurement information that is based on the single access node to the positioning service function entity, the UE is accurately positioned, and a problem that a plurality of base stations have a strict requirement on time and data synchronization is avoided.

For the foregoing embodiment of positioning a terminal device, in a system, if all UEs support multipath positioning measurement that is based on a single access node, and can identify multipath measurement information that is based on the single access node, the positioning service function entity may choose to consider by default that all the UEs have a capability of supporting the multipath positioning measurement that is based on the single access node. If it is not considered by default that all UEs in a system have a capability of supporting the multipath positioning measurement that is based on the single access node, the positioning service function entity needs to determine a positioning measurement capability supported by UE, to determine whether to position the UE in a multipath positioning measurement manner that is based on the single access node. The positioning service function entity determines the positioning measurement capability supported by the UE, and may learn, by using a UE report, of the capability supported by the UE, and determine whether the UE supports the multipath positioning measurement that is based on the single access node. Optionally, if the capability of the UE is fixed, the capability supported by the UE may be obtained by using a third party (for example, a device capability register function entity). This is described below by using a specific interaction procedure.

Figure 4:
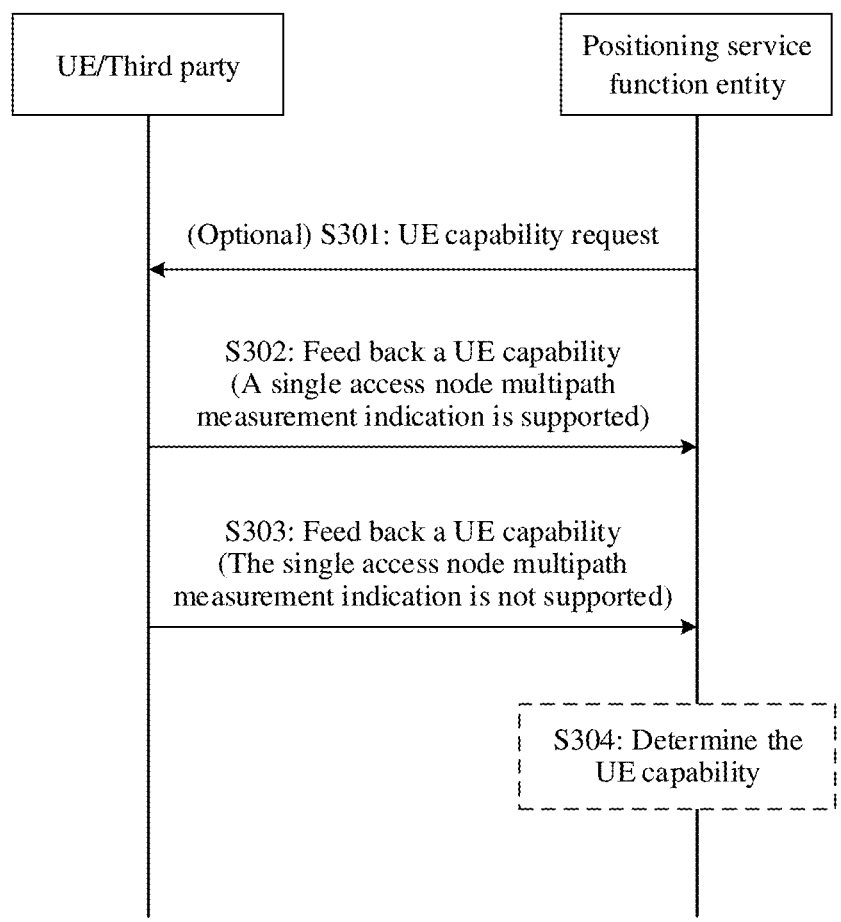
FIG. 4 is a schematic interaction flowchart of determining a positioning measurement capability supported by a terminal device according to this disclosure.

FIG. 4 is a schematic interaction flowchart of determining a positioning measurement capability supported by a terminal device according to this disclosure. As shown in FIG. 4, determining a positioning measurement capability supported by UE includes the following steps.

S301: A positioning service function entity sends a capability request of the UE to the UE/a third party.

This step is an optional step. It may be understood that the positioning service function entity may determine the positioning measurement capability supported by the UE, by sending a capability request when necessary, to instruct the UE/the third party to perform a feedback, or the positioning service function entity may determine the positioning measurement capability through periodical reporting performed by the UE/the third party. The positioning service function entity sends the capability request, so that a feedback by the UE/the third party can be triggered as required, thereby reducing overheads caused by frequent reporting performed by the UE/the third party.

If the capability request is sent to the UE, optionally, the capability request may be carried in an LPP message for sending, and the LPP protocol includes positioning capability (Positioning Capabilities) interaction. This is merely an example. Alternatively, the request may be carried in another message in an LTE system, or the request may be carried in another message in a terminal in a 5G network or in a future evolved public land mobile network (PLMN for short).

It should be noted that the following steps S302 and S303 are not sequential steps in the procedure, and the two steps are two processing manners in different cases in which the UE has the positioning measurement capability.

S302: The UE/the third party feeds back a capability supported by the UE to the positioning service function entity, where the capability indicates that the UE supports multipath measurement that is based on a single access node.

The UE/the third party may indicate, in a manner such as by using a specific field or some bits in a message fed back to the positioning service function entity, whether the UE supports some capabilities. Optionally, if there are a plurality of positioning measurement manners in a system, whether the UE supports these capabilities is indicated by using value information such as 0 and 1 in indication bits corresponding to these positioning manners.

Optionally, if the UE has a capability of detecting and identifying multipath measurement information of the single access node, after receiving the request, for example, the request carried in an LPP message, the UE adds 1-bit information to capability information related to an LPP, for example, a multicomponent identification (MPC Identification for short), and MPC Identification=ON(=1) indicates that the UE can identify the multipath measurement information of the single access node. This example is not intended to limit this disclosure. That the UE supports the capability may be indicated by using MPC Identification=ON(=0) or in another manner, or the indication information may be carried in another message.

S303: The UE/the third party feeds back a capability supported by the UE to the positioning service function entity, where the capability indicates that the UE does not support the multipath measurement that is based on the single access node.

The UE/the third party may indicate, in a manner such as by using a specific field or some bits in a message fed back to the positioning service function entity, whether the UE supports some capabilities. Optionally, if there are a plurality of positioning measurement manners in a system, whether the UE supports these capabilities is indicated by using value information such as 0 and 1 in indication bits corresponding to these positioning manners.

Optionally, if the UE does not have a capability of detecting and identifying the multipath measurement information of the single access node, after receiving the request, for example, the request carried in an LPP message, the UE adds 1-bit information to capability information related to an LPP. For example, MPC Identification=OFF(=0) indicates that the UE cannot identify the multipath measurement information of the single access node. This example is not intended to limit this disclosure. That the UE does not support the capability may be indicated by using MPC Identification=ON(=1) or in another manner, or the indication information may be carried in another message.

S304: The positioning service function entity determines a capability of the UE based on received UE capability feedback information.

The positioning service function entity can determine, based on the UE capability feedback information, whether the UE supports the multipath positioning measurement that is based on the single access node, and further determine whether to implement location estimation on the UE in this manner. When it is determined that the UE supports this manner, the location estimation on the UE may be implemented with reference to the manners in Embodiment 1 and Embodiment 2.

This implementation can enable the positioning service function entity to determine a positioning measurement manner that can be supported by the UE, thereby effectively implementing positioning.

Embodiment 3

Figure 5:
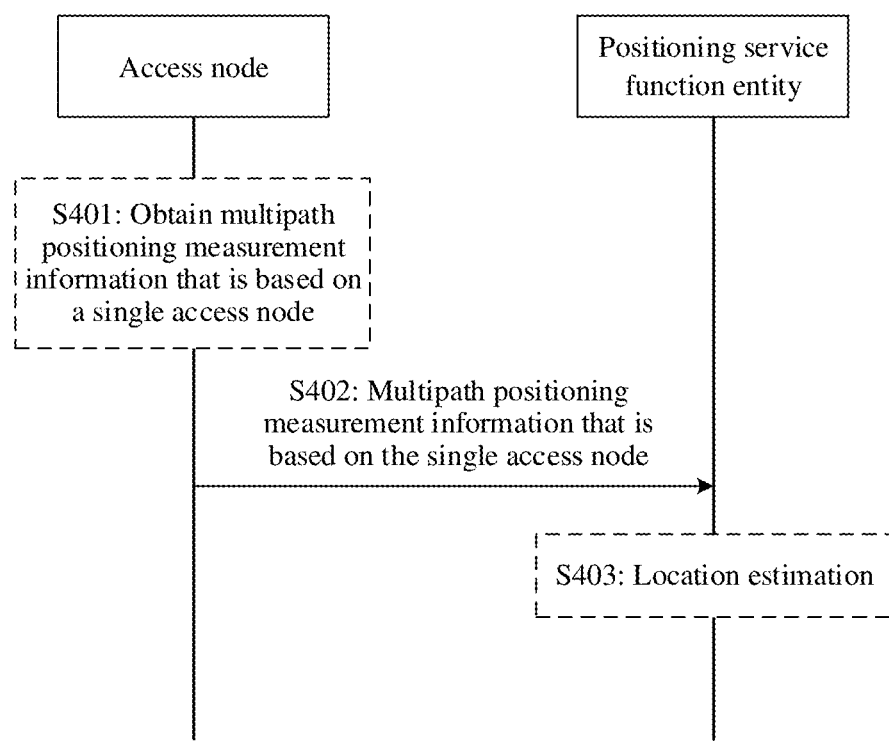
FIG. 5 is a flowchart of a first embodiment of another method for positioning a terminal device according to this disclosure.

According to this embodiment of this disclosure, FIG. 5 is a flowchart of a first embodiment of another method for positioning a terminal device according to this disclosure. For ease of understanding of the solution, during description, this embodiment and subsequent embodiments are described as a whole from a perspective of a plurality of interaction parties. However, it is not limited that steps on all interaction sides in a system need to be performed together. The technical solution provided in this disclosure is improved on each side of the system.

The method includes the following steps.

S401: An access node obtains multipath positioning measurement information that is based on a single access node.

The access node is a single access node. The access node may obtain the positioning measurement information from an entity capable of performing positioning measurement, or the access node may obtain the positioning measurement information by directly performing positioning measurement. Specifically, the positioning measurement is multipath positioning measurement that is based on the single access node and that is performed based on a positioning reference signal sent by UE that is to be positioned. The positioning measurement information is measurement result information of the multipath positioning measurement that is based on the single access node.

The positioning measurement that is based on the single access node needs to be implemented in combination with the multi-path positioning measurement. A multipath includes a main path between the UE and the single access node and at least one reflection path between the access node and a reflector, or at least two reflection paths corresponding to a reflector, where there is at least one reflector in the system. However, it should be noted that, if there are a plurality of reflection paths, the plurality of reflection paths include reflection paths respectively corresponding to a plurality of reflectors, and also include a plurality of reflection paths corresponding to one reflector in a plurality of times of measurement. In addition, the access node is not necessarily an access node that has been accessed by the UE that is to be positioned. The access node may be an access node near the UE, and is configured to position the UE. The access node may detect an AOA and/or a TOA of a same signal (an uplink positioning reference signal) by using a multi-antenna technology, to obtain measurement values of a multipath AOA and/or TOA Manners similar to those in Embodiment 1 may be selected and used as measurement and estimation manners of the TOA and the AOA, and details are not described herein again.

Optionally, the access node may periodically obtain the positioning measurement information, or may obtain the positioning measurement information based on triggering of a request sent by the positioning service function entity or triggering of a positioning reference signal sent by the UE.

S402: The access node sends the multipath positioning measurement information that is based on the single access node to the positioning service function entity, and the positioning service function entity receives the positioning measurement information.

Through signaling interaction between the access node and the positioning service function entity, the access node sends a message carrying the positioning measurement information of the UE to the positioning service function entity, so that the positioning service function entity obtains the measurement result information of the multipath positioning measurement that is based on the single access node and that is performed on the UE. Optionally, in different systems, the access node may add, to different messages, the multipath positioning measurement information that is based on the single access node. For example, in an LTE system, point-to-point bidirectional transfer between the access node and the positioning service function entity may be implemented by using an LTE positioning protocol annex (LPPa for short). The LPPa protocol includes transfer of location information (Location Information). Therefore, the positioning measurement information may be carried in an LPPa message. It should be noted that the "location information (Location Information)" herein may not only represent actual location estimation on the UE, but also may represent measurement data (for example, TOA and AOA measurement) used for positioning calculation. The foregoing is merely an example. Alternatively, the positioning measurement information may be carried in another message in the LTE system, or the positioning measurement information may be carried in another message in a terminal in a 5G network or a future evolved public land mobile network (PLMN for short).

Optionally, the access node may periodically send the positioning measurement information to the positioning service function entity, or may send the positioning measurement information based on triggering of a request sent by the positioning service function entity or triggering of a positioning reference signal sent by the UE.

S403: The positioning service function entity performs location estimation on the UE based on the received positioning measurement information, to implement positioning.

A manner similar to that in Embodiment 1 may be selected and used as a manner for performing location estimation on the UE, and details are not described herein again.

According to the method for positioning a terminal device in this embodiment of this disclosure, by using the interaction procedure in which the access node reports the multipath measurement information that is based on the single access node and that is performed on the UE to the positioning service function entity, the UE is accurately positioned, and a problem that a plurality of base stations have a strict requirement on time and data synchronization is avoided.

Embodiment 4

Figure 6:
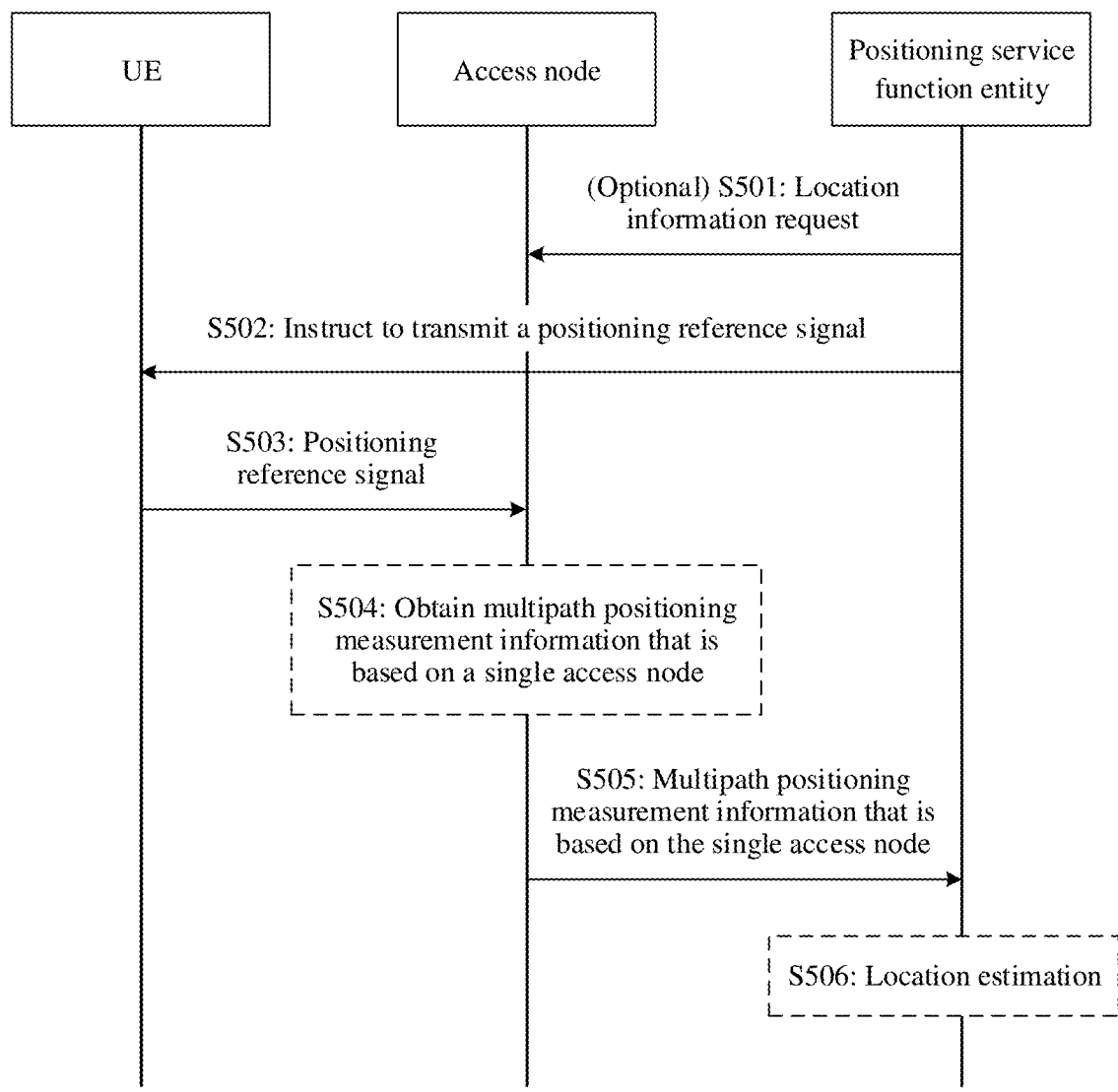
FIG. 6 is a flowchart of a second embodiment of another method for positioning a terminal device according to this disclosure.

FIG. 6 is a flowchart of a second embodiment of another method for positioning a terminal device according to this disclosure. A difference between this embodiment and Embodiment 3 lies in that, in this embodiment, an interaction procedure between UE and another object is added, and content that is the same as or similar to that in Embodiment 3 is not described in this embodiment again.

The method includes the following steps.

S501: A positioning service function entity sends a location information request to an access node.

The interaction procedure is optional, because in a procedure of positioning the UE, optionally, the access node may periodically report the positioning measurement information, or the positioning service function entity may send the location information request to the access node, to trigger the interaction procedure. The positioning service function entity sends the location information request to the access node, to instruct the access node to send positioning measurement information. Triggering may be performed as required, thereby reducing overheads caused by frequent reporting of positioning measurement information by the access node. The location information request may be carried in an LPPa message for sending. This is merely an example. Alternatively, the request may be carried in another message in an LTE system, or the request may be carried in another message in a terminal in a 5G network or in a future evolved public land mobile network (PLMN for short).

S502: The positioning service function entity sends, to the UE, instruction information for instructing the UE to transmit a positioning reference signal.

The positioning service function entity sends the instruction to the UE that is to be positioned, to instruct the UE to send the positioning reference signal for positioning. Optionally, the instruction may be carried in an LTE positioning protocol (LPP for short) message for sending. This is merely an example. Alternatively, the instruction may be carried in another message in the LTE system, or may be carried in another message in a terminal in a 5G network or a future evolved public land mobile network (PLMN for short).

S503: The UE sends the positioning reference signal to the access node.

The UE sends the positioning reference signal to the access node near the UE. Optionally, the positioning reference signal may be a reference signal specially used for positioning, or may be an existing signal such as a PRS or a CRS. Optionally, that the UE sends the positioning reference signal to the access node may be sending the positioning reference signal to an entity (for example, a measurement unit that is disposed separately from the access node) that completes positioning measurement on an access node side.

S504: The access node obtains multipath positioning measurement information that is based on a single access node and that is for the UE.

For details, refer to step S401 in Embodiment 3. Details are not described herein again. Certainly, this disclosure is not limited thereto.

S505: The access node sends the multipath positioning measurement information that is based on the single access node to the positioning service function entity, and the positioning service function entity receives the positioning measurement information.

For details, refer to step S402 in Embodiment 3. Details are not described herein again. Certainly, this disclosure is not limited thereto.

S506: The positioning service function entity performs location estimation on the UE based on the received positioning measurement information, to implement positioning.

For details, refer to step S403 in Embodiment 3. Details are not described herein again. Certainly, this disclosure is not limited thereto.

According to the method for positioning a terminal device in this embodiment of this disclosure, by using the interaction procedure in which the positioning service function entity instructs the UE to transmit the positioning reference signal, and the access node reports the multipath measurement information that is based on the single access node and that is for the UE to the positioning service function entity, the UE is accurately positioned, and a problem that a plurality of base stations have a strict requirement on time and data synchronization is avoided.

For the foregoing embodiment of positioning a terminal device, in a system, if all access nodes support multipath positioning measurement that is based on a single access node, and can identify multipath measurement information that is based on the single access node, the positioning service function entity may choose to consider by default that all the access nodes have a capability of supporting the multipath positioning measurement that is based on the single access node. If it is not considered by default that all access nodes in a system have a capability of supporting the multipath positioning measurement that is based on the single access node, before the foregoing interaction procedure of the positioning measurement, the positioning service function entity needs to determine a positioning measurement capability supported by the access node, to determine whether to position, by using the access node, the UE in a multipath positioning measurement manner that is based on the single access node. The positioning service function entity determines the positioning measurement capability supported by the access node, and may learn, by using an access node report, of the capability supported by the access node, and determine whether the access node supports the multipath positioning measurement that is based on the single access node. Optionally, if the capability of the access node is fixed, the capability supported by the access node may be obtained by using a third party (for example, a device capability register function entity). This is described below by using a specific interaction procedure.

Figure 7:
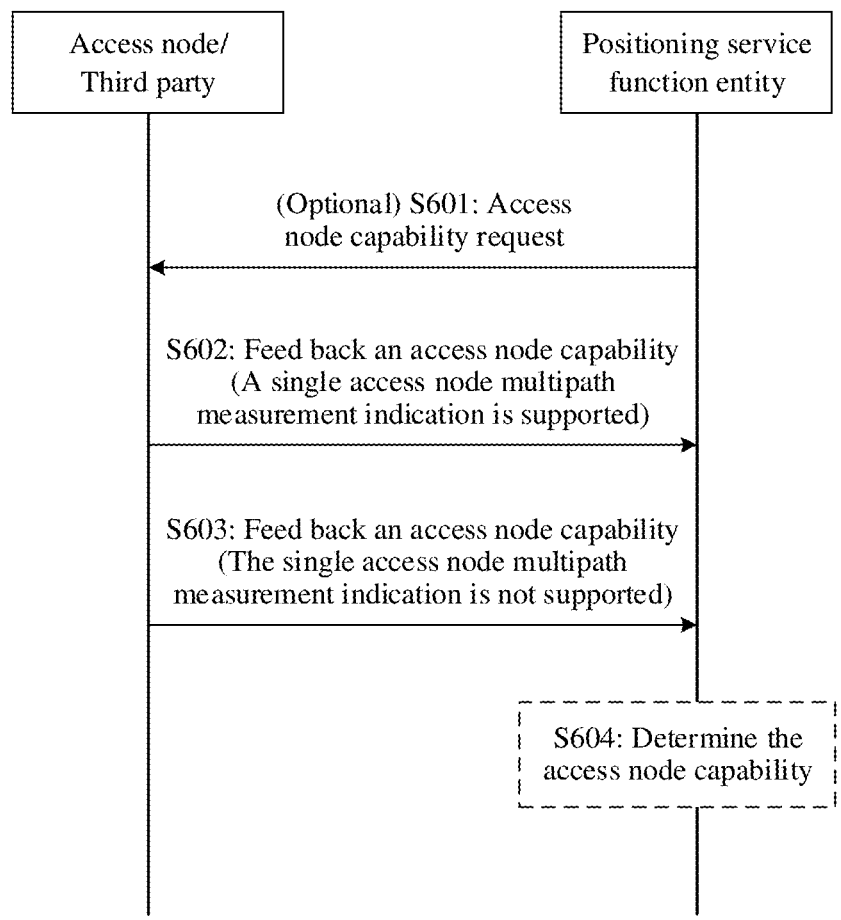
FIG. 7 is a schematic interaction flowchart of determining a positioning measurement capability supported by an access node according to this disclosure.

FIG. 7 is a schematic interaction flowchart of determining a positioning measurement capability supported by an access node according to this disclosure. As shown in FIG. 7, determining the positioning measurement capability supported by the access node includes the following steps.

S601: A positioning service function entity sends a capability request of the access node to the access node/a third party.

This step is an optional step. It may be understood that the positioning service function entity may determine the positioning measurement capability supported by the access node, by sending the capability request when necessary, to instruct the access node/the third party to perform a feedback, or the positioning service function entity may determine the positioning measurement capability through periodical reporting performed by the access node/the third party. The positioning service function entity sends the capability request, so that a feedback by the access node/the third party can be triggered as required, thereby reducing overheads caused by frequent reporting performed by the access node/the third party.

If the capability request is sent to the access node, optionally, the capability request may be carried in an LPPa message for sending, and the LPPa protocol includes positioning capability (Positioning Capabilities) interaction. This is merely an example. Alternatively, the request may be carried in another message in an LTE system, or the request may be carried in another message in a terminal in a 5G network or in a future evolved public land mobile network (PLMN for short).

It should be noted that the following steps S602 and S603 are not sequential steps in the procedure, and the two steps are two processing manners in different cases in which the access node has the positioning measurement capability.

S602: The access node/the third party feeds back a capability supported by the access node to the positioning service function entity, where the capability indicates that the access node supports multipath measurement that is based on a single access node.

The access node/the third party may indicate, in a manner such as by using a specific field or some bits in a message fed back to the positioning service function entity, whether the access node supports some capabilities. Optionally, if there are a plurality of positioning measurement manners in a system, whether the access node supports these capabilities is indicated by using value information such as 0 and 1 in indication bits corresponding to these positioning manners.

Optionally, if the access node has a capability of detecting and identifying multipath measurement information of the single access node, after receiving the request, the access node adds 1-bit information to capability information related to an LPPa, for example, a multicomponent identification (MPC Identification for short), and MPC Identification=ON (=1) indicates that the access node can identify the multipath measurement information of the single access node. This example is not intended to limit this disclosure. That the access node supports the capability may be indicated by using MPC Identification=ON(=0), or the indication information may be carried in another message.

S603: The access node/the third party feeds back a capability supported by the access node to the positioning service function entity, where the capability indicates that the access node does not support the multipath measurement that is based on the single access node.

The access node/the third party may indicate, in a manner such as by using a specific field or some bits in a message fed back to the positioning service function entity, whether the access node supports some capabilities. Optionally, if there are a plurality of positioning measurement manners in a system, whether the access node supports these capabilities is indicated by using value information such as 0 and 1 in indication bits corresponding to these positioning manners.

Optionally, if the access node has a capability of detecting and identifying the multipath measurement information of the single access node, after receiving the request, the access node adds 1-bit information to capability information related to an LPPa. For example, MPC Identification=OFF(=0) indicates that the access node cannot identify the multipath measurement information of the single access node. This example is not intended to limit this disclosure. That the access node does not support the capability may be indicated by using MPC Identification=ON(=1), or the indication information may be carried in another message.

S604: The positioning service function entity determines a capability of the access node based on received access node capability feedback information.

The positioning service function entity can determine, based on the access node capability feedback information, whether the access node supports the multipath positioning measurement that is based on the single access node, and further determine whether to implement location estimation on the UE in this manner by using the access node. When it is determined that the access node supports this manner, the location estimation on the UE may be implemented in the manners in Embodiment 3 and Embodiment 4

This implementation can enable the positioning service function entity to determine a positioning measurement manner that can be supported by the access node configured to position the UE, thereby effectively positioning the UE.

In the foregoing embodiment, the location estimation on the UE is described separately from perspectives of sending, on a UE side, the multipath positioning measurement information that is based on the single access node and sending, on an access node side, the multipath positioning measurement information that is based on the single access node. It may be understood that the positioning service function entity may perform location estimation on the UE based on the measurement information reported by the UE, or the measurement information reported by the access node, or the measurement information reported by both the UE and the access node. The following describes a calculation method that may be selected and used for performing location estimation by the positioning service function entity.

Embodiment 5

Figure 8:
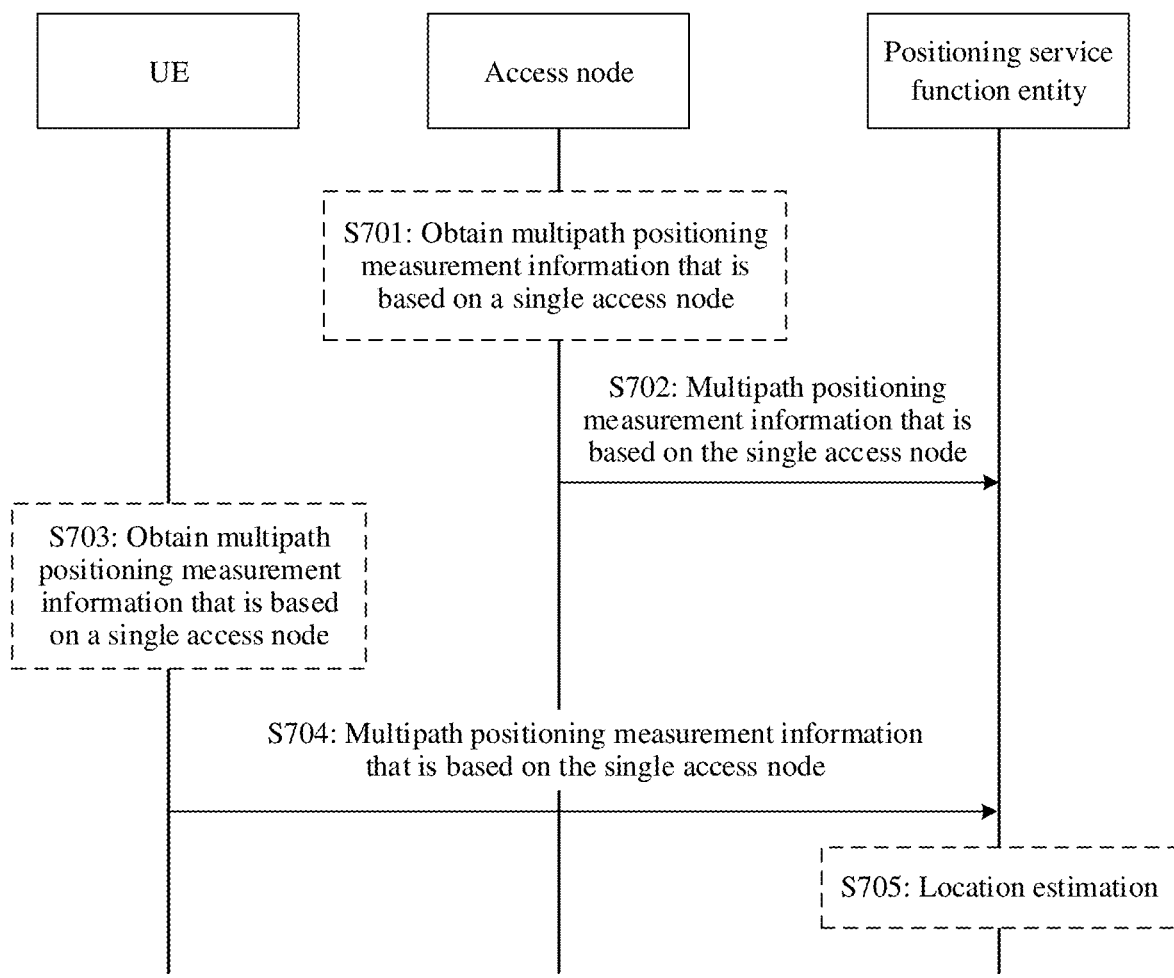
FIG. 8 is a flowchart of an embodiment of another method for positioning a terminal device according to this disclosure.

FIG. 8 is a flowchart of an embodiment of another method for positioning a terminal device according to this disclosure. In this embodiment, a calculation method for performing location estimation by a positioning service function entity is mainly described, and only main steps related to sending of positioning measurement information are described. The method is not limited to these steps, and may further include other related steps in Embodiment 2 and/or Embodiment 3. For details, refer to the foregoing embodiments, details are not described herein again.

S701: An access node obtains multipath positioning measurement information that is based on a single access node.

S702: The access node sends the multipath positioning measurement information that is based on the single access node to the positioning service function entity, and the positioning service function entity receives the positioning measurement information.

S701 and S702 are respectively similar to S401 and S402 in the foregoing embodiment. For details, refer to the descriptions of S401 and S402. Details are not described herein again.

S703: UE obtains the multipath positioning measurement information that is based on the single access node.

S704: The UE sends the multipath positioning measurement information that is based on the single access node to the positioning service function entity, and the positioning service function entity receives the positioning measurement information.

S703 and S704 are respectively similar to S101 and S102 in the foregoing embodiment. For details, refer to the descriptions of S101 and S102. Details are not described herein again.

It should be noted that, S701 and S702, and S703 and S704 are not necessarily performed in a particular sequence, and are merely intended for objects that perform different actions. S701 and S702, and S703 and S704 do not necessarily all exist. In different scenarios, S701 and S702 may not exist, or S703 and S704 may not exist.

S705: The positioning service function entity performs location estimation on the UE based on the received positioning measurement information, to implement positioning.

The positioning service function entity may perform location estimation on the UE based on measurement information reported by the UE and/or the access node. For location estimation performed on the UE based on the measurement information reported by the UE or the access node, refer to the location estimation performed on the UE in the manners described in S103 and S206 or S403 and S506 in the foregoing embodiments. For location estimation performed on the UE based on the measurement information reported by the UE and the access node, refer to the location estimation performed on the UE in the manners described in S103, S206, S403, and S506 in the foregoing embodiments. Optionally, an average value of a result of the location estimation performed based on the measurement information reported by the UE and a result of the location estimation result performed based on the measurement information reported by the access node is calculated, to determine a final location of the UE.

For different cases, the following detailed calculation method may be specifically selected and used to perform location estimation on the UE. This is merely an example description of the calculation method, and this disclosure is not limited thereto.

Technical solution A: For "(solution a)" in which the positioning service function entity performs location estimation in the foregoing embodiment, the UE or the access node provides the positioning measurement information, and multipath positioning measurement values include measurement values of TOAs and AOAs of a main path and at least one reflection path.

S1: Calculate a location $\hat{x}_r[k]$ of the UE relative to the access node at a moment k based on the measurement values of the TOA and the AOA of the main path:

$$\hat{x}_r[k] = \hat{d}_1[k][\cos(\hat{\theta}_1[k])\sin(\hat{\theta}_1[k])]$$

Herein, $\hat{d}_1[k]$ and $\hat{\theta}_1[k]$ are respectively a propagation distance and the measurement value of the AOA of the main path at the moment k. Then, the location $x_{BS}$ of the access node and the location $\hat{x}_r[k]$ of the UE relative to the access node are summed, to obtain the location estimation on the UE at the moment k:

$$\hat{x}_{UE}[k] = x_{BS} + \hat{x}_r[k]$$

S2: Perform location estimation on a reflector by using particle swarm optimization (PSO for short). It is assumed that there are M reflectors in the scenario, and locations of the reflectors remain unchanged in a measurement process. A cost function for performing location estimation on a reflector l (l=1, . . . , M) by using the PSO algorithm is:

$$f_R^{(l)}(\hat{x}_R^{(l)}[k]) = \frac{(\|\hat{x}_R^{(l)}[k] - x_{BS}\| + \|\hat{x}_R^{(l)}[k] - \hat{x}_{UE}[k]\| - \|\hat{x}_{UE}[k] - x_{BS}\| - r^{(l)}[k])^2}{2(\sigma_{Diff,1}^{(l)}[k])^2} + \frac{(\hat{d}_R^{(l)}[k] - d_R(\hat{x}_R^{(l)}[k], \hat{x}_{UE}[k]))^2}{2\sigma_{TOA}^2} + \frac{(\hat{\theta}_R^{(l)}[k] - \theta_R(\hat{x}_R^{(l)}[k], \hat{x}_{UE}[k]))^2}{2\sigma_{AOA}^2}$$

Herein, $\hat{x}_R^{(l)}[k]$ is an estimated location of the reflector l at the moment k. $r^{(l)}[k]$ is a difference between a distance measurement value of a reflection path (introduced by the reflector l) and a distance measurement value of a main path at the moment k. $\sigma_{Diff}^{(l)}[k]$ is a standard deviation of distance differences between reflection paths and main paths that correspond to the location estimation $\hat{x}_R^{(l)}[k]$ on the reflector and the location estimation $\hat{x}_{UE}[k]$ on the terminal at the moment k. $\hat{d}_R^{(l)}[k]$ is the distance measurement value (which is calculated based on the TOA of the reflection path) of the reflection path at the moment k. $d_R(\hat{x}_R^{(l)}[k], \hat{x}_{UE}[k])$ is an estimated value of the reflection path distance obtained at the moment k based on the location estimation on the UE and the location estimation on the reflector (which is determined based on an estimated location from the location of the access node to the reflector l and an estimated location from the reflector l to the estimated location of the UE). $d_R(\hat{x}_R^{(l)}[k], \hat{x}_{UE}[k])=\|\hat{x}_R^{(l)}[k]-x_{BS}\|+\|\hat{x}_R^{(l)}[k]-\hat{x}_{UE}[k]\|$. σAOA is a measurement standard deviation of a TOA. $\hat{\theta}_R^{(l)}[k]$ is the measurement value (which is calculated based on an angle of arrival AOA of the reflection path) of the AOA of the reflection path at the moment k. $\theta_R(\hat{x}_R^{(l)}[k], \hat{x}_{UE}[k])$ is an angle of an estimated location of the reflector l relative to the access node at the moment k. $\sigma_{AOA}$ is a measurement standard deviation of the AOA. $\sigma_{TOA}$ and $\sigma_{AOA}$ are constants, and values of $\sigma_{AOA}$ and $\sigma_{AOA}$ may be different for different antennas, and may be empirical values.

After the location estimation on the reflector at the moment k is obtained, an average value of historical estimated values of the reflector is calculated, to obtain more accurate location estimation:

$$\tilde{x}_R^{(l)}[k] = \frac{1}{k}\sum_{i=1}^{k} \hat{x}_R^{(l)}[i]$$

S3: Use the PSO algorithm to obtain second location estimation on the UE by using the location of the access node, the measurement values of the TOA and the AOA of the main path at the moment k, and the estimation result $\tilde{x}_R^{(l)}[l]$ of the reflector obtained in step 2, where a cost function of the PSO algorithm is:

$$f_{UE}(\tilde{x}_{UE}[k]) = \frac{\sum_{l=1}^{M}(\|\tilde{x}_R^{(l)}[k]-x_{BS}\|+\|\tilde{x}_R^{(l)}[k]-\tilde{x}_{UE}[k]\|-\|\tilde{x}_{UE}[k]-x_{BS}\|-r^{(l)}[k])^2}{2(\sigma_{Diff,2}^{(l)}[k])^2} + \frac{(\hat{d}_l[k]-d_l(\tilde{x}_{UE}[k]))^2}{2\sigma_{TOA}^2} + \frac{(\hat{\theta}_l[k]-\theta_l(\tilde{x}_{UE}[k]))^2}{2\sigma_{AOA}^2}$$

In the function, $\tilde{x}_{UE}[k]$ is the second location estimation on the UE at the moment k. $\sigma_{Diff,2}^{(l)}[k]$ is a standard deviation of distance differences between reflection paths and main paths that correspond to location estimation $\tilde{x}_R^{(l)}[k]$ on a reflector at the moment k and the second location estimation $\tilde{x}_{UE}[k]$ n the UE. $d_1(\tilde{x}_{UE}[k])$ is a distance of a main path that is based on the second location estimation on the UE at the moment k. $d_1(\tilde{x}_{UE}[k])=\|\tilde{x}_{UE}[k]-x_{BS}\|$, and $\hat{d}_1[k]$ and $\hat{\theta}_1[k]$ are respectively a propagation distance and the measurement value of the AOA of the main path at the moment k. $\theta_l(\tilde{x}_{UE}[k])$ is an angle of a second estimated location of the UE at the moment k relative to the access node.

Technical solution B: For "(solution b)" in which the positioning service function entity performs location estimation in the foregoing embodiment, the UE or the access node provides the positioning measurement information, and multipath positioning measurement values include measurement values of TOAs and AOAs of at least two reflection paths.

S1: Estimate a location of the reflector by using the PSO algorithm. It is assumed that there are M reflectors in the scenario, and locations of the reflectors remain unchanged in a measurement process. A cost function for performing location estimation on the UE and the M reflectors by using the PSO algorithm is:

$$f_R(\hat{x}_R^{(l)}[k], \cdots, \hat{x}_R^{(l)}[k], \hat{x}_{UE}[k]) = \sum_{m=1}^{M-1}\sum_{n=m+1}^{M}\frac{(d_R(\hat{x}_R^{(m)}[k], \hat{x}_{UE}[k])-d_R(\hat{x}_R^{(n)}[k], \hat{x}_{UE}[k])-r^{(m,n)}[k])^2}{2(\sigma_{Diff,1}[k])^2} + \sum_{l=1}^{M}\frac{(\hat{d}_R^{(l)}[k]-d_R(\hat{x}_R^{(l)}[k], \hat{x}_{UE}[k]))^2}{2\sigma_{TOA}^2} + \sum_{l=1}^{M}\frac{(\hat{\theta}_R^{(l)}[k]-\theta_R(\hat{x}_R^{(l)}[k]))^2}{2\sigma_{AOA}^2}$$

Herein, $\hat{x}_{UE}[k]$ is location estimation on the UE at the moment k. $\hat{x}_R^{(m)}[k]$ is location estimation on a reflector m (m=1, . . . , M−1) at the moment k. $\hat{x}_R^{(n)}[k]$ is location estimation on a reflector n (n=m+1, m+2, . . . , M) at the moment k. $r^{(m,n)}[k]$ is a difference between distance measurement values of a reflection path (introduced by the reflector m) and a reflection path (introduced by the reflector n) at the moment k. $d_R(\hat{x}_R^{(m)}[k], \hat{x}_{UE}[k])=\|\hat{x}_R^{(m)}[k]-\hat{x}_{BS}\|+\|\hat{x}_R^{(m)}[k]-\hat{x}_{UE}[k]\|$ is a distance of a reflection path determined at the moment k based on the location of the access node, location estimation on the reflector m, and location estimation on the UE. $d_R(\hat{x}_R^{(n)}[k])=\|\hat{x}_R^{(n)}[k]-x_{BS}\|+\|\hat{x}_R^{(n)}[k]-\hat{x}_{UE}[k]\|$ is a distance of a reflection path determined at the moment k based on the location of the access node, location estimation on the reflector n, and location estimation on the UE. $\sigma_{Diff,1}[k]$ is a standard deviation of distance differences between location estimation $\hat{x}_{UE}[k]$ on the UE and location estimation $\hat{x}_R^{(m)}[k]$ and $\hat{x}_R^{(n)}[k]$ on reflectors at the moment k. $\hat{d}_R^{(l)}[k]$ is a distance measurement value (which is calculated based on a TOA of a reflection path) of the reflection path (introduced by the reflector l (l=1, . . . , M)) at the moment k. $d_R(\hat{x}_R^{(l)}[k], \hat{x}_{UE}[k])=\|\hat{x}_R^{(l)}[k]-x_{BS}\|+\|\hat{x}_R^{(l)}[k]-\hat{x}_{UE}[k]\|$ is a distance of a reflection path obtained at the moment k based on the location of the access node, location estimation on the UE, and location estimation on the reflector l (l=1, . . . , M). $\sigma_{TOA}$ is a measured standard deviation of a TOA. $\hat{\theta}_R^{(l)}[k]$ is a measurement value of an AOA of the reflection path (introduced by the reflector l (l=1, . . . , M)) at the moment k. $\theta_R(\hat{x}_R^{(l)}[k])$ is an angle of an estimated location of the reflector l (l=1, . . . , M) relative to the access node at the moment k. $\sigma_{AOA}$ is a measured standard deviation of the AOA. $\sigma_{TOA}$ and $\sigma_{AOA}$ are constants, and values of $\sigma_{TOA}$ and $\sigma_{AOA}$ may be different for different antennas, and may be empirical values.

After the location estimation on the M reflectors at the moment k is obtained, an average value of historical estimated values of each reflector is calculated, to obtain more accurate location estimation:

$$\tilde{x}_R^{(l)}[k] = \frac{1}{k}\sum_{i=1}^{k}\hat{x}_R^{(l)}[i], (l=1,\cdots,M)$$

S2: Use the PSO algorithm to obtain second location estimation on the UE by using the location of the access node, measurement values of the TOA and the AOA of the reflection path at the moment k, and the estimation result $\hat{x}_R^{(l)}[k]$ (l=1, ..., M) of the reflector obtained in S1, where a cost function of the PSO algorithm is:

$$f_{UE}(\tilde{x}_{UE}[k]) = \frac{\sum_{m=1}^{M-1}\sum_{n=m+1}^{M}\left(d_R(\hat{x}_R^{(m)}[k],\hat{x}_{UE}[k])-d_R(\hat{x}_R^{(n)}[k],\hat{x}_{UE}[k])-r^{(m,n)}[k]\right)^2}{2(\sigma_{Diff,2}[k])^2} +$$

$$\frac{\sum_{l=1}^{M}\left(\hat{d}_R^{(l)}[k]-d_R(\hat{x}_R^{(l)}[k],\hat{x}_{UE}[k])\right)^2}{2\sigma_{TOA}^2}$$

In the function, $\hat{x}_{UE}[k]$ is the second location estimation on the UE at the moment k. $d_R(\tilde{x}_R^{(m)}[k], \hat{x}_{UE}[k]) = \|\tilde{x}_R^{(m)}[k] - x_{BS}\| + \|\tilde{x}_R^{(m)}[k] - \tilde{x}_{UE}[k]\|$ is a distance of a reflection path determined at the moment k based on the location of the access node, location estimation on the UE, and location estimation on the reflector m (m=1, ..., M). $d_R(\tilde{x}_R^{(n)}[k], \tilde{x}_{UE}[k]) = \|\tilde{x}_R^{(n)}[k] - x_{BS}\| + \|\tilde{x}_R^{(n)}[k] - \tilde{x}_{UE}[k]\|$ is a distance of a reflection path determined at the moment k based on the location of the access node, location estimation on the UE, and location estimation on the reflector n (n=m+1, m+2, ..., M). $\sigma_{Diff,2}[k]$ is a standard deviation of distance differences between reflection paths that correspond to location estimation $\tilde{x}_R^{(m)}[k]$ on a reflector at the moment k and the second location estimation $\tilde{x}_{UE}[k]$ on the UE. $d_R(\tilde{x}_R^{(l)}[k], \tilde{x}_{UE}[k]) = \|\tilde{x}_R^{(l)}[k] - x_{BS}\| + \|\tilde{x}_R^{(l)}[k] - \tilde{x}_{UE}[k]\|$ is a distance of a reflection path determined at the moment k based on the location $x_{BS}$ of the access node, location estimation on the reflector l (l=1, ..., M), and the second location estimation on the UE.

Technical solution C: If the UE and the access node provide the positioning measurement information, and multipath positioning measurement values include measurement values of TOAs and AOAs of a main path and at least one reflection path, according to the foregoing technical solution A of this disclosure, the second location estimation $\tilde{x}_{UE,1}[k]$ on the UE at the moment k (where the second location estimation $\tilde{x}_{UE,1}[k]$ on the UE is obtained based on the positioning measurement information provided by the UE), and the second location estimation $\tilde{x}_{UE,2}[k]$ on the UE that is obtained based on the positioning measurement information provided by the access node are separately calculated. Then, an average value of the two location estimation results is calculated, to obtain final location estimation on the UE:

$$\tilde{x}_{UE}[k]=\tfrac{1}{2}(\tilde{x}_{UE,1}[k]+\tilde{x}_{UE,2}[k])$$

Technical solution D: If the UE and the access node provide the positioning measurement information, and multipath positioning measurement values include measurement values of TOAs and AOAs of at least two reflection paths, according to the foregoing technical solution B of this disclosure, the second location estimation on the UE at the moment k, where the second location estimation $\tilde{x}_{UE,1}[k]$ on the UE is obtained based on the positioning measurement information provided by the UE, and the second location estimation $\tilde{x}_{UE,2}[k]$ on the UE that is obtained based on the positioning measurement information provided by the access node are separately calculated. Then, an average value of the two location estimation results is calculated, to obtain final location estimation on the UE:

$$\tilde{x}_{UE}[k]=\tfrac{1}{2}(\tilde{x}_{UE,1}[k]+\tilde{x}_{UE,2}[k])$$

The foregoing describes the solutions in the embodiments of this disclosure mainly by using a procedure in which various entities in the system interact with each other to position a terminal device. It may be understood that, to implement the foregoing functions, each of the entities includes corresponding hardware structures and/or software modules for performing the functions. A person skilled in the art should easily be aware that, in combination with units and algorithm steps of the examples described in the embodiments disclosed in this specification, this disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In the embodiments of this disclosure, functional modules in the UE, the access node, and the positioning service function entity may be obtained through division based on the foregoing method examples. For example, functional modules may be obtained through division in correspondence with functions, or two or more functions may be integrated into one processing module. The integrated module may be implemented in a form of hardware, or may be implemented in a form of a software functional module. It should be noted that, in this embodiment of this disclosure, module division is exemplary, and is merely logical function division. During actual implementation, another division manner may be used. An example in which functional modules are divided based on functions is used hereinafter for description.

Figure 9:
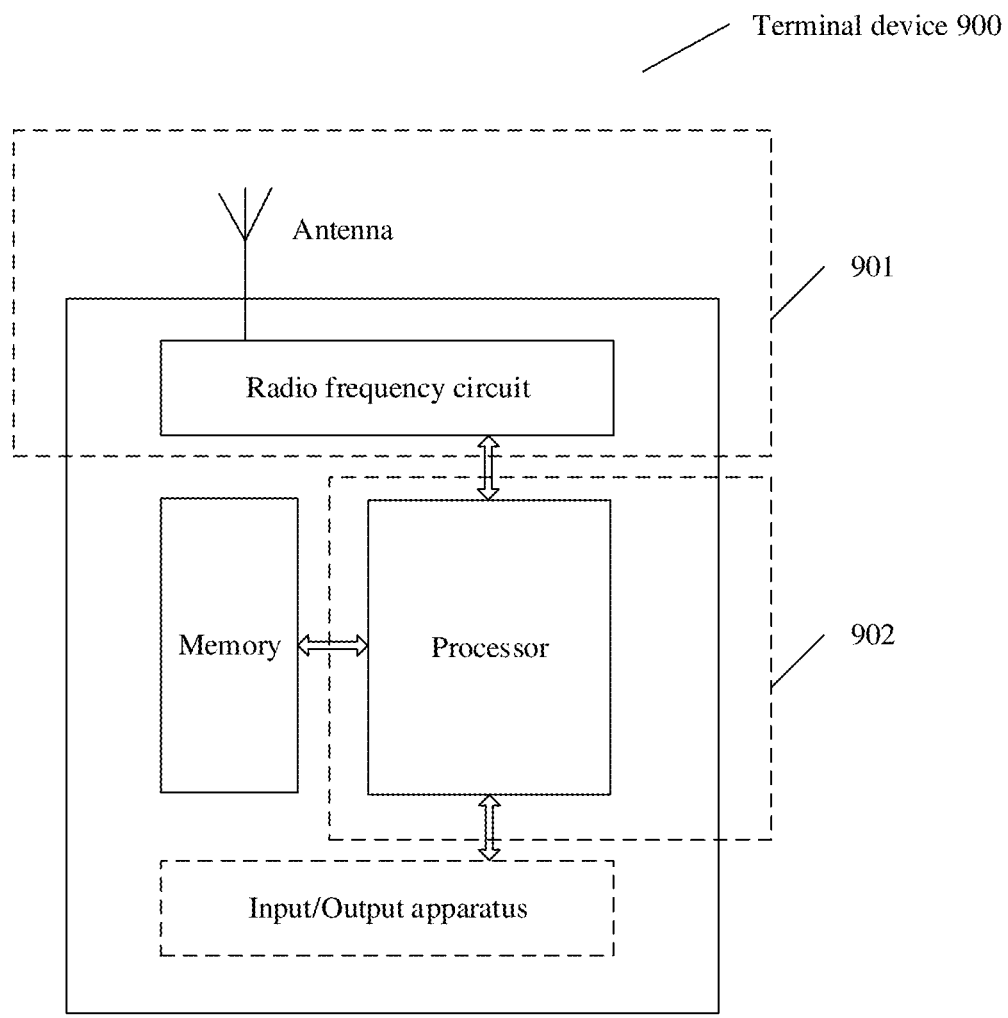
FIG. 9 is a schematic structural diagram of a simplified terminal device according to this disclosure.

An embodiment of this disclosure further provides a terminal device. The terminal device may be configured to perform the steps performed by the UE in any one of FIG. 2 to FIG. 4, FIG. 6, and FIG. 8. FIG. 9 is a schematic structural diagram of a simplified terminal device. For ease of understanding and convenience of figure illustration, an example in which the terminal device is a mobile phone is used in FIG. 9. As shown in FIG. 9, the terminal device 900 includes a processor, a memory, a radio frequency circuit, an antenna, and an input/output apparatus. The processor is mainly configured to: process a communication protocol and communication data, control the terminal device 900, execute a software program, process data of the software program, and so on. The memory is mainly configured to store a software program and data. The radio frequency circuit is mainly configured to: perform conversion between a baseband signal and a radio frequency signal, and process a radio frequency signal. The antenna is mainly configured to receive and send a radio frequency signal in a form of an electromagnetic wave. The input/output apparatus such as a touchscreen, a display screen, or a keyboard is mainly configured to: receive data entered by a user, and output data to the user. It should be noted that some types of terminal devices 900 may have no input/output apparatus. The memory and the processor may be integrated together, or may be disposed independently.

When data needs to be sent, after performing baseband processing on the to-be-sent data, the processor outputs a baseband signal to a radio frequency circuit. After the radio frequency circuit performs radio frequency processing on the baseband signal, a radio frequency signal is sent by using the antenna in an electromagnetic wave form. When data is sent to the terminal device 900, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 9 shows only one memory and processor. An actual terminal device product may include one or more processors and one or more memories. The memory may also be referred to as a storage medium, a storage device, or the like. The memory may be disposed independent of the processor, or may be integrated with the processor. This is not limited in this embodiment of this disclosure.

In this embodiment of this disclosure, an antenna and a radio frequency circuit that have a receiving and sending function may be considered as a transceiver unit of the terminal device 900, and a processor having a processing function may be considered as a processing unit of the terminal device 900. As shown in FIG. 9, the terminal device 900 includes the transceiver unit 901 and the processing unit 902. The transceiver unit may also be referred to as a transceiver (including a transmitter and/or a receiver), a transceiver machine, a transceiver apparatus, or the like. The processing unit may also be referred to as a processor, a processing board, a processing module, a processing apparatus, or the like. Optionally, a component configured to implement a receiving function in the transceiver unit 901 may be considered as a receiving unit, and a component configured to implement a sending function in the transceiver unit 901 may be considered as a sending unit. In other words, the transceiver unit 901 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like. In some embodiments, the transceiver unit 901 and the processing unit 902 may be integrated together or may be disposed independently. In addition, all functions of the processing unit 902 may be integrated into one chip for implementation. Alternatively, some functions may be integrated into one chip for implementation and some other functions are integrated into one or more other chips for implementation. This is not limited in this disclosure.

For example, in an implementation, the transceiver unit 901 is configured to perform the steps performed by the UE in S102 in FIG. 2, and/or other steps in this disclosure. The processing unit 902 is configured to perform S101 in FIG. 2, and/or other steps in this disclosure.

For example, in another implementation, the transceiver unit 901 is configured to perform the steps performed by the UE in S201, S203, and/or S205 in FIG. 3, and/or other steps in this disclosure. The processing unit 902 is configured to perform S204 in FIG. 3, and/or other steps in this disclosure.

For example, in another implementation, the transceiver unit 901 is configured to perform the steps performed by the UE in S301, S302, and/or S303 in FIG. 4, and/or other steps in this disclosure. The processing unit 902 is configured to perform other steps in this disclosure.

For example, in another implementation, the transceiver unit 901 is configured to perform the steps performed by the UE in S502 and/or S503 in FIG. 6, and/or other steps in this disclosure. The processing unit 902 is configured to perform other steps in this disclosure.

For example, in another implementation, the transceiver unit 901 is configured to perform the steps performed by the UE in S704 in FIG. 8, and/or other steps in this disclosure. The processing unit 902 is configured to perform S703 in FIG. 8, and/or other steps in this disclosure.

Figure 10:
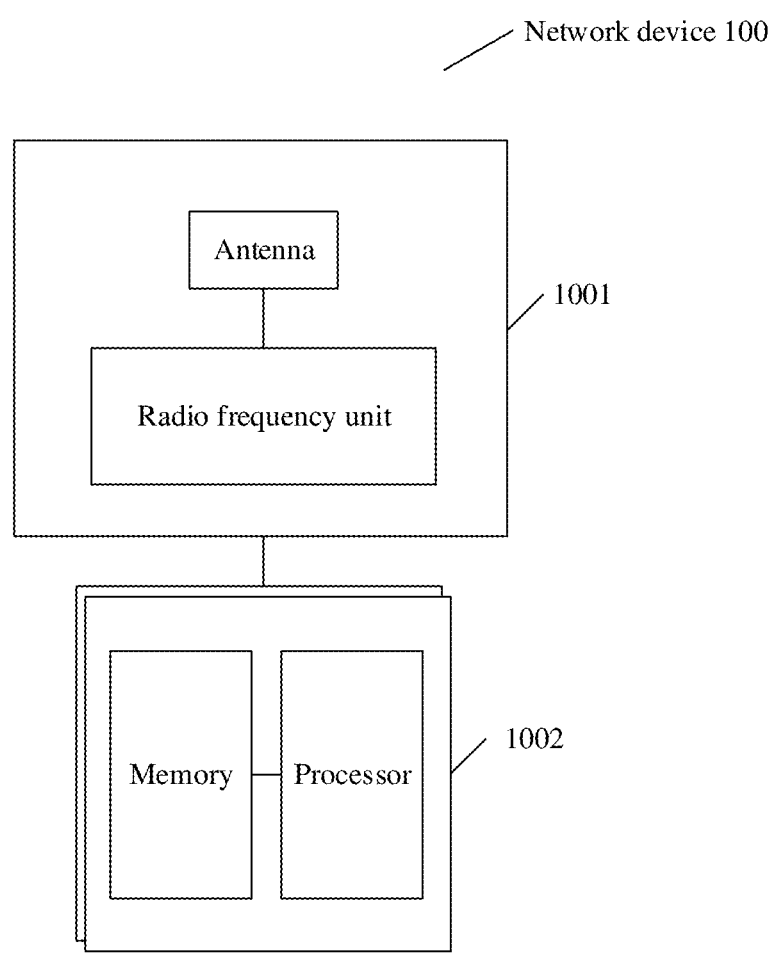
FIG. 10 is a schematic structural diagram of a simplified network device according to this disclosure.

An embodiment of this disclosure further provides a network device. The network device may be used as an access node to perform the steps performed by the access node in any one of FIG. 3 and FIG. 5 to FIG. 8. FIG. 10 is a schematic structural diagram of a simplified network device. The network device 100 includes a part 1001 and a part 1002. The part 1001 is mainly configured to receive and send a radio frequency signal and perform conversion between the radio frequency signal and a baseband signal. The part 1002 is mainly configured to: perform baseband processing, control the network device 100, and so on. The part 1001 may be usually referred to as a transceiver unit, a transceiver machine, a transceiver circuit, a transceiver, or the like. The part 1002 is usually a control center of the network device 100, may be usually referred to as a processing unit, and is configured to control the network device 100 to perform the steps performed by the access node in the foregoing related embodiments. For details, refer to the foregoing descriptions of the related parts.

A transceiver unit of the part 1001 may also be referred to as a transceiver machine, a transceiver, or the like. The transceiver unit includes an antenna and a radio frequency unit. The radio frequency unit is mainly configured to perform radio frequency processing. Optionally, a component configured to implement a receiving function in the part 1001 may be considered as a receiving unit, and a component configured to implement a sending function may be considered as a sending unit. In other words, the part 1001 includes the receiving unit and the sending unit. The receiving unit may also be referred to as a receiver machine, a receiver, a receiver circuit, or the like, and the sending unit may be referred to as a transmitter machine, a transmitter, a transmitter circuit, or the like.

The part 1002 may include one or more boards. Each board may include one or more processors and one or more memories. The processor is configured to read and execute a program in the memory to implement a baseband processing function and control the network device 100. If there are a plurality of boards, the boards may be interconnected to enhance a processing capability. In an optional implementation, a plurality of boards may share one or more processors, or a plurality of boards share one or more memories, or a plurality of boards simultaneously share one or more processors. The memory and the processor may be integrated together, or may be disposed independently. In some embodiments, the part 1001 and the part 1002 may be integrated together, or may be disposed independently. In addition, all functions of the part 1002 may be integrated into one chip for implementation. Alternatively, some functions may be integrated into one chip for implementation and some other functions are integrated into one or more other chips for implementation. This is not limited in this disclosure.

For example, in an implementation, the transceiver unit is configured to perform the steps performed by the access node in S202 and/or S203 in FIG. 3, and/or other steps in this disclosure. The processing unit is configured to perform other steps in this disclosure.

For example, in another implementation, the transceiver unit is configured to perform the steps performed by the access node in S402 in FIG. 5, and/or other steps in this disclosure. The processing unit is configured to perform S401 in FIG. 5, and/or other steps in this disclosure.

For example, in another implementation, the transceiver unit is configured to perform the steps performed by the access node in S501, S503 and/or SS505 in FIG. 6, and/or other steps in this disclosure. The processing unit is configured to perform S504 in FIG. 6, and/or other steps in this disclosure.

For example, in another implementation, the transceiver unit is configured to perform the steps performed by the access node in S601, S602 and/or S603 in FIG. 7, and/or other steps in this disclosure. The processing unit is configured to perform other steps in this disclosure.

For example, in another implementation, the transceiver unit is configured to perform the steps performed by the access node in S702 in FIG. 8, and/or other steps in this disclosure. The processing unit is configured to perform S701 in FIG. 8, and/or other steps in this disclosure.

Figure 11:
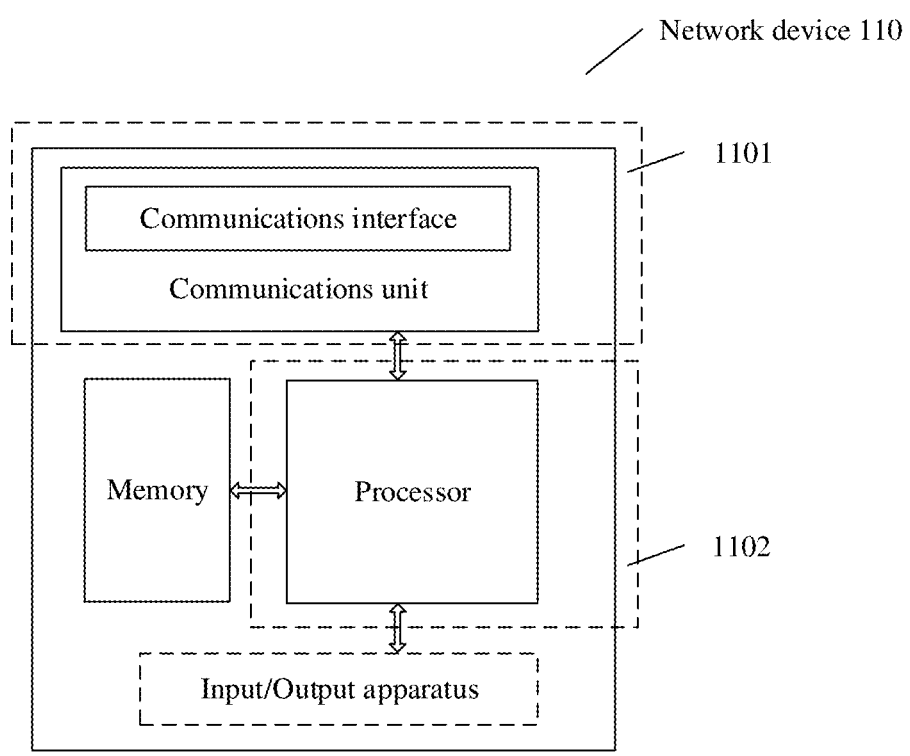
FIG. 11 is a schematic structural diagram of another simplified network device according to this disclosure.

An embodiment of this disclosure further provides another network device. The network device may be used as a positioning service function entity to perform the steps performed by the positioning service function entity in any one of FIG. 2 to FIG. 8. FIG. 11 is another schematic structural diagram of a simplified network device. In FIG. 11, the network device 110 includes a processor, a memory, a communications unit including a communications interface, and an optional input/output apparatus. The processor is mainly configured to: process a communication protocol and communication data, control the network device 110, execute a software program, process data of the software program, and so on. The memory is mainly configured to store a software program and data. The communications unit is mainly configured to perform transmission processing for network communication. The communications interface performs interface processing related to network communication, and is mainly configured to receive and send a message and data. The input/output apparatus such as an indicator, a touchscreen, a display screen, or a keyboard is mainly configured to: receive data entered by an operator, and output data to the operator. It should be noted that some types of network devices may have no input/output apparatus. The memory and the processor may be integrated together, or may be disposed independently.

When data needs to be sent, the processor processes the to-be-sent data, and outputs the to-be-sent data to the communications unit. The communications unit performs interface processing by using the communications interface, and then sends the data to the outside. When data is sent to the network device 110, the communications unit receives the data by using the communications interface, processes the data, and outputs the data to the processor, and the processor further processes the data. For ease of description, FIG. 11 shows only one memory and processor. An actual device may include one or more processors and one or more memories. The memory may also be referred to as a storage medium, a storage device, or the like. The memory may be disposed independent of the processor, or may be integrated with the processor. This is not limited in this embodiment of this disclosure.

In this embodiment of this disclosure, a communications interface and a communications unit that have a receiving and sending function may be considered as a transceiver unit of the network device 110, and a processor having a processing function may be considered as a processing unit of the network device 110. As shown in FIG. 11, the network device 110 includes the transceiver unit 1101 and the processing unit 1102. The transceiver unit may also be referred to as a transceiver (including a transmitter and/or a receiver), a transceiver machine, a transceiver apparatus, or the like. The processing unit may also be referred to as a processor, a processing board, a processing module, a processing apparatus, or the like. Optionally, a component configured to implement a receiving function in the transceiver unit 1101 may be considered as a receiving unit, and a component configured to implement a sending function in the transceiver unit 1101 may be considered as a sending unit. In other words, the transceiver unit 1101 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like. In some embodiments, the transceiver unit 1101 and the processing unit 1102 may be integrated together or may be disposed independently. In addition, all functions of the processing unit 1102 may be integrated into one chip for implementation. Alternatively, some functions may be integrated into one chip for implementation and some other functions are integrated into one or more other chips for implementation. This is not limited in this disclosure.

For example, in an implementation, the transceiver unit 1101 is configured to perform the steps performed by the positioning service function entity in S102 in FIG. 2, and/or other steps in this disclosure. The processing unit 1102 is configured to perform S103 in FIG. 2, and/or other steps in this disclosure.

For example, in another implementation, the transceiver unit 1101 is configured to perform the steps performed by the positioning function entity in S201, S202, and/or S205 in FIG. 3, and/or other steps in this disclosure. The processing unit 1102 is configured to perform S206 in FIG. 3, and/or other steps in this disclosure.

For example, in another implementation, the transceiver unit 1101 is configured to perform the steps performed by the positioning service function entity in S301, S302, and/or S303 in FIG. 4, and/or other steps in this disclosure. The processing unit 1102 is configured to perform S304 in FIG. 4, and/or other steps in this disclosure.

For example, in another implementation, the transceiver unit 1101 is configured to perform the steps performed by the positioning service function entity in S402 in FIG. 5, and/or other steps in this disclosure. The processing unit 1102 is configured to perform S403 in FIG. 5, and/or other steps in this disclosure.

For example, in another implementation, the transceiver unit 1101 is configured to perform the steps performed by the positioning service function entity in S501, S502, and/or S505 in FIG. 6, and/or other steps in this disclosure. The processing unit 1102 is configured to perform S506 in FIG. 6, and/or other steps in this disclosure.

For example, in another implementation, the transceiver unit 1101 is configured to perform the steps performed by the positioning service function entity in S601, S602, and/or S603 in FIG. 7, and/or other steps in this disclosure. The processing unit 1102 is configured to perform S604 in FIG. 7, and/or other steps in this disclosure.

For example, in another implementation, the transceiver unit 1101 is configured to perform the steps performed by the positioning service function entity in S702 and/or S704 in FIG. 8, and/or other steps in this disclosure. The processing unit 1102 is configured to perform S705 in FIG. 8, and/or other steps in this disclosure.

For explanations and beneficial effects of related content in any of the foregoing provided communications apparatuses, refer to corresponding method embodiments provided above, and details are not described herein again.

This disclosure further provides a system for positioning a terminal. The system includes the positioning service function entity, the UE, and/or the access node in the foregoing implementations.

This disclosure further provides a computer program product. When the computer program product runs on a computer, the computer is enabled to perform any method provided above. This disclosure further provides a communications chip. The chip stores an instruction. When the instruction is run on each entity, each entity is enabled to perform the method provided above.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this disclosure is described with reference to the embodiments, in a process of implementing this disclosure that claims protection, persons skilled in the art may understand and implement another variation of the disclosed embodiments by viewing the accompanying drawings, disclosed content, and the accompanying claims. In the claims, "including" does not exclude another component or another step, and "a" or "one" does not exclude a meaning of plurality. A single processor/controller or another unit may implement several functions enumerated in the claims. Some measures are recorded in dependent claims that are different from each other, but this does not mean that these measures cannot be combined to produce a better effect.

Although this disclosure is described with reference to specific features and the embodiments thereof, obviously, various modifications and combinations may be made to them without departing from the spirit and scope of this disclosure. Correspondingly, the specification and accompanying drawings are merely example description of this disclosure defined by the accompanying claims, and is considered as any of or all modifications, variations, combinations or equivalents that cover the scope of this disclosure. Obviously, a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. A measurement apparatus for determining a positioning of a terminal device, wherein the measurement apparatus is applied to a terminal device side, and comprises at least one processor, wherein the at least one processor is configured to execute instructions in a memory, and cause the apparatus to implement, based on the instructions:

obtaining positioning measurement information for a terminal device, wherein the positioning measurement information is a measurement result information of a multipath positioning measurement that is based on a single access node and that is performed based on a positioning reference signal sent by the single access node; and sending the positioning measurement information to a positioning service function entity such that the positioning service function entity is configured to perform location estimation on the terminal device based on the positioning measurement information;

wherein the multipath positioning measurement comprises a positioning measurement for a main path and at least one reflection path corresponding to a reflector, or a positioning measurement for at least two reflection paths corresponding to one or more reflectors, and the apparatus is caused to further implement: estimating a location of the reflector corresponding to the at least one reflection path and performing the location estimation on the terminal device based on the estimated location of the reflector, or estimating a location of the one or more reflectors corresponding to the at least two reflection paths and performing the location estimation on the terminal device based on the estimated location of the one or more reflectors.

2. The measurement apparatus according to claim 1, wherein the at least one processor is configured to execute the instructions in the memory, and cause the apparatus to further implement, based on the instructions:

before obtaining the positioning measurement information for the terminal device, sending device capability indication information of the terminal device to the positioning service function entity, wherein the device capability indication information indicates whether the terminal device supports the multipath positioning measurement that is based on the single access node.

3. The measurement apparatus according to claim 1, wherein the at least one processor is configured to execute the instructions in the memory, and cause the apparatus to further implement, based on the instructions:

before obtaining the positioning measurement information for the terminal device, receiving a positioning reference signal sent by the single access node.

4. The measurement apparatus according to claim 1, wherein the positioning measurement comprises at least one of the following: a measurement on a time of arrival (TOA) used for distance positioning or a measurement on an angle of arrival (AOA) used for angle positioning.

5. The measurement apparatus according to claim 1, wherein the location of the reflector corresponding to the at least one reflection path or the location of the one or more reflectors corresponding to the at least two reflection paths is estimated based on an estimated location of the terminal device.

6. A measurement apparatus for determining a positioning of a terminal device, wherein the measurement apparatus is applied to an access node side, and comprises at least one processor, wherein the at least one processor is configured to execute instructions in a memory, and cause the apparatus to implement, based on the instructions:

obtaining positioning measurement information for a terminal device, wherein the positioning measurement information is a measurement result information of a multipath positioning measurement that is based on a single access node and that is performed based on a positioning reference signal sent by the terminal device; and sending the positioning measurement information to a positioning service function entity such that the positioning service function entity is configured to perform location estimation on the terminal device based on the positioning measurement information; wherein:

the multipath positioning measurement comprises a positioning measurement for a main path and at least one reflection path corresponding to a reflector, or a positioning measurement for at least two reflection paths corresponding to one or more reflectors, the apparatus further implements: estimating a location of the reflector corresponding to the at least one reflection path and performing the location estimation on the terminal device based on the estimated location of the reflector, or estimating a location of the one or more reflectors corresponding to the at least two reflection paths and performing the location estimation on the terminal device based on the estimated location of the one or more reflectors, and the location of the reflector corresponding to the at least one reflection path or the location of the one or more reflectors corresponding to the at least two reflection paths is estimated based on an estimated location of the terminal drive.

7. The measurement apparatus according to claim 6, wherein the at least one processor is configured to execute the instructions in the memory, and cause the apparatus to further implement, based on the instructions:

before obtaining the positioning measurement information for the terminal device, sending device capability indication information of the terminal device to the positioning service function entity, wherein the device capability indication information indicates whether an access node supports the multipath positioning measurement that is based on the single access node.

8. The measurement apparatus according to claim 6, wherein the at least one processor is configured to execute the instructions in the memory, and cause the apparatus to further implement, based on the instructions:

before obtaining the positioning measurement information for the terminal device, receiving a positioning reference signal sent by the terminal device.

9. The measurement apparatus according to claim 6, wherein the positioning measurement comprises at least one of the following: a measurement on a time of arrival (TOA) used for distance positioning or a measurement on an angle of arrival (AOA) used for angle positioning.

10. A method for determining a positioning of a terminal device, the method comprising:

obtaining, by a terminal device, positioning measurement information for the terminal device, wherein the positioning measurement information is measurement result information of multipath positioning measurement that is based on a single access node and that is performed based on a positioning reference signal sent by the single access node; and sending, by the terminal device, the positioning measurement information to a positioning service function entity, wherein the positioning measurement information is used by the positioning service function entity to perform location estimation on the terminal device;

wherein the multipath positioning measurement comprises a positioning measurement for a main path and at least one reflection path corresponding to a reflector, or a positioning measurement for at least two reflection paths corresponding to one or more reflectors, and the method further comprises: estimating a location of the reflector corresponding to the at least one reflection path and performing the location estimation on the terminal device based on the estimated location of the reflector; or estimating a location of the one or more reflectors corresponding to the at least two reflection paths and performing the location estimation on the terminal device based on the estimated location the of the one or more reflectors.

11. The method according to claim 10, wherein before the obtaining, by a terminal device, positioning measurement information for the terminal device, the method further comprises:

sending, by the terminal device, device capability indication information of the terminal device to the positioning service function entity, wherein the device capability indication information indicates whether the terminal device supports the multipath positioning measurement that is based on the single access node.

12. The method according to claim 10, wherein before the obtaining, by a terminal device, positioning measurement information for the terminal device, the method further comprises:

receiving, by the terminal device, the positioning reference signal sent by the single access node.

13. The method according to claim 10, wherein the positioning measurement comprises at least one of the following: a measurement on a time of arrival (TOA) used for distance positioning or a measurement on an angle of arrival (AOA) used for angle positioning.

14. The method according to claim 10, wherein the location of the reflector corresponding to the at least one reflection path or the location of the one or more reflectors corresponding to the at least two reflection paths is estimated based on an estimated location of the terminal device.

15. A method for determining a positioning of a terminal device, the method comprising:

obtaining, by an access node, positioning measurement information for a terminal device, wherein the positioning measurement information is measurement result information of multipath positioning measurement that is based on a single access node and that is performed based on a positioning reference signal sent by the terminal device; and sending, by the access node, the positioning measurement information to a positioning service function entity, wherein the positioning measurement information is used by the positioning service function entity to perform location estimation on the terminal device; wherein:

the multipath positioning measurement comprises a positioning measurement for a main path and at least one reflection path corresponding to a reflector, or a positioning measurement for at least two reflection paths corresponding to one or more reflectors, the method further comprises: estimating a location of the reflector corresponding to the at least one reflection path and performing the location estimation on the terminal device based on the estimated location of the reflector, or estimating a location of the one or more reflectors corresponding to the at least two reflection paths and performing the location estimation on the terminal device based on the estimated location of the one or more reflectors, and the location of the reflector corresponding to the at least one reflection path or the location of the one or more reflectors corresponding to the at least two reflection paths is estimated based on an estimated location of the terminal device.

16. The method according to claim 15, wherein before the obtaining, by an access node, positioning measurement information for the terminal device, the method further comprises:

sending, by the access node, device capability indication information of the access node to the positioning service function entity, wherein the device capability indication information indicates whether the access node supports the multipath positioning measurement that is based on the single access node.

17. The method according to claim 15, wherein before the obtaining, by an access node, positioning measurement information for the terminal device, the method further comprises:

receiving, by the access node, the positioning reference signal sent by the terminal device.

18. The method according to claim 15, wherein the positioning measurement comprises at least one of the following: a measurement on a time of arrival (TOA) used for distance positioning or a measurement on an angle of arrival (AOA) used for angle positioning.

* * * * *